(12) United States Patent
Roland et al.

(10) Patent No.: US 9,993,786 B2
(45) Date of Patent: Jun. 12, 2018

(54) USE OF EUGENOL POLYETHERS AND EUGENOL POLYETHER SILOXANES AS WETTING AGENTS

(71) Applicant: Evonik Degussa GmbH, Essen (DE)

(72) Inventors: Katrin Roland, Essen (DE); Matthias Lobert, Essen (DE); Michael Ferenz, Essen (DE); Thorsten Schierle, Essen (DE)

(73) Assignee: EVONIK DEGUSSA GMBH, Essen (DE)

( * ) Notice: Subject to any disclaimer, the term of this patent is extended or adjusted under 35 U.S.C. 154(b) by 0 days. days.

(21) Appl. No.: 15/255,931

(22) Filed: Sep. 2, 2016

(65) Prior Publication Data

US 2017/0065951 A1    Mar. 9, 2017

(30) Foreign Application Priority Data

Sep. 3, 2015  (EP) .................................... 15183632

(51) Int. Cl.

| | | |
|---|---|---|
| *C09D 4/00* | (2006.01) | |
| *C09D 11/107* | (2014.01) | |
| *B01F 17/00* | (2006.01) | |
| *C08G 65/40* | (2006.01) | |
| *C08G 65/48* | (2006.01) | |
| *C09D 11/03* | (2014.01) | |
| *C08G 77/46* | (2006.01) | |

(52) U.S. Cl.
CPC ...... *B01F 17/0028* (2013.01); *C08G 65/4087* (2013.01); *C08G 65/48* (2013.01); *C08G 77/46* (2013.01); *C09D 11/03* (2013.01); *C09D 11/107* (2013.01); *Y02P 20/582* (2015.11)

(58) Field of Classification Search
None
See application file for complete search history.

(56) References Cited

U.S. PATENT DOCUMENTS

| | | | | |
|---|---|---|---|---|
| 4,413,073 A | * | 11/1983 | Gibson ................... | C08F 2/24 523/501 |
| 6,001,922 A | * | 12/1999 | Clark .................... | C08F 257/02 524/457 |

FOREIGN PATENT DOCUMENTS

EP    0 094 386 B1    3/1986

OTHER PUBLICATIONS

Extended European Search Report dated Sep. 8, 2016 in Patent Application No. 16182680.5 (with English translation of categories of cited documents ).
Y. Barakat, et al., "Salinity-Alkane Carbon Number (ACN) Relationship of Some Anionic Nonionic Surfactant Mixtures," Chemistry and Materials Research, vol. 6, No. 12. XP055248931, (2014), pp. 55-77.

* cited by examiner

*Primary Examiner* — Richard A Huhn
(74) *Attorney, Agent, or Firm* — Grüneberg and Myers PLLC

(57) ABSTRACT

The present invention relates to compositions comprising eugenol polyethers and/or eugenol polyethers modified with siloxanes, and to the use of eugenol polyethers in polyether siloxanes based on these eugenol polyethers as wetting agents.

10 Claims, No Drawings

USE OF EUGENOL POLYETHERS AND EUGENOL POLYETHER SILOXANES AS WETTING AGENTS

BACKGROUND OF THE INVENTION

Field of the Invention

The present invention relates to compositions comprising eugenol polyethers and/or eugenol polyethers modified with siloxanes, and to the use of eugenol polyethers and polyether siloxanes based on these eugenol polyethers as wetting agents.

Discussion of the Background

Water-based inks and varnishes are used industrially on a large scale. A crucial factor for good wetting of the substrate is that the surface tension of the aqueous system is lowered with the aid of a surfactant. What is crucial here is that not just the static surface tension is lowered to a low value, but also the dynamic surface tension. More particularly, a low dynamic surface tension is required for high-speed applications, for example in the spray application of coatings or in the sector of printing processes. Furthermore, the surfactants used must not disrupt the formation of a homogeneous film and not cause any cloudiness, and should additionally be low-foaming, i.e. not promote the buildup of large amounts of foam.

Specifically in the case of use of such surfactants in the field of printing food packaging, there exist very high demands on the substances used with regard to their migration capacity into the foods. To avoid absorption of such substances into the human body, said substances must have little, if any, migration potential. Accordingly, the synthesis of such surfactants requires a very specific selection of raw materials. Even the base components should be toxicologically safe. It is of particular importance that the starting materials, if they are incompletely converted in the reaction to give the surfactant and hence are still present in the product, are non-toxic even in small amounts and exhibit a low level of migration into the foods.

The wetting agents known in the prior art generally fulfil the criterion of food compatibility and low migration only to a limited degree, if at all.

A frequently used class of surfactants is that of the fluorosurfactants. They feature very significant lowering of the static surface tension, but have a significant tendency to foam. DE102011052991B4 describes, for example, the use of fluorosurfactants in dry offset printing for wetting of the printing plate, which is difficult to wet. DE102009032615A1 describes the use of fluorosurfactants in writing ink formulations which can be used for easy-clean surfaces, i.e. those that are likewise difficult to wet. Only recently, the use of fluorinated surfactants has been greatly restricted. Perfluorosurfactants (PFTs) have been detected ubiquitously and are to be found in drinking water in particular. The half-life of these substances in the human body is very long, resulting in accumulation in the organism.

A further, frequently used class of surfactants is based on acetylenic glycols and their alkoxylates. With these surfactants, it is possible to reduce both the static and dynamic surface tension, but the achievable values do not quite reach those for the nonionic and anionic surfactants. On the other hand, formulations comprising these surfactants are comparatively low-foaming (EP-B-0 897 744, U.S. Pat. No. 2,997,447). WO 2014/098001 A1 describes, for example, the use of acetylenic surfactants in inkjet printing inks.

A problem is the (eco)toxicological assessment of products based on 2,4,6,8-tetramethyl-5-decynediol. The products lead to severe eye irritation, are classified as sensitizing on eye contact, and accumulate in water bodies. The only products available to the paint manufacturer from this substance class are solid products, or the substance, for easy handling, is supplied as a 50% solution in various solvents, for example ethylene glycol (classified as harmful to health, suspected teratogen).

In addition, ethoxylates or ethylene oxide-propylene oxide copolymers of octyl- or nonylphenols are used as surfactants for lowering surface tension. For example, US 2014/0078217 A1 describes the use of nonylphenol ethoxylates for a fixing fluid for printing of nonporous surfaces.

In the case of surfactants of this class too, however, ecotoxicological findings have to be taken into account. It has been proven that the reactants of the ethoxylate surfactants used, i.e. octyl- and nonylphenol, interfere in the hormone metabolism of fish. Correspondingly, the starting materials and also the surfactants themselves are classified as a water pollutant and are already banned in many applications. The use of these substances in varnishes and inks is currently still permitted. Owing to various regulations, however, the use thereof in printing food packaging is already forbidden.

SUMMARY OF THE INVENTION

It is therefore an object of the present invention to provide wetting agents which meet the tight requirements for additives having contact with food, which are simultaneously stable homogeneous compounds and can especially be used as substrate wetting agents.

It has now been found that, surprisingly, eugenol-based polyethers, also referred to hereinafter as eugenol polyethers, and the polyether siloxanes prepared therefrom, meet all the stated demands and are of excellent suitability as wetting agents. According to the invention, "eugenol-based polyether" is understood to mean a polyether which is composed of at least three alkoxy units and was prepared using eugenol as alcoholic starter. A process for preparation thereof is described in the as yet unpublished patent application with filing reference DE102014217790.1. DE 102014217790.1 is hereby cited by reference and is considered to form part of the disclosure-content of the present patent application.

Surfactant polyethers based on aromatic alcohols, i.e. phenols, as starters are sufficiently well-known as described in U.S. Pat. No. 5,296,627 A and U.S. Pat. No. 6,646,091 B2 for example.

Documents EP 94386 B1 and DE 3342509 A1 describe compositions comprising eugenol-based polyethers.

A first detailed description of the alkali-catalysed alkoxylation of eugenol is given in EP 1717259 A1. In the examples reported therein, eugenol is initially charged as starter and then admixed with an alkaline catalyst such as sodium methoxide. After removal of the methanol from this catalysis step, ethylene oxide, propylene oxide and/or butylene oxide are added on at temperatures of 140-160° C. This procedure demonstrably affords pure isoeugenol-based polyethers, meaning that the eugenol allyl group undergoes quantitative rearrangement to form a 2-propenyl group during the alkaline alkoxylation. The resulting structural unit is known to those skilled in the art by the name of isoeugenol. There is no description of use of such eugenol polyethers as wetting agents.

Polyether siloxanes bearing eugenol groups are known in principle from the scientific literature. The term "polyether siloxane" in these cases arises from the fact that, in general, not only eugenol but also conventional terminally unsaturated polyethers, for example alkoxylates of allyl alcohols, are hydrosilylated onto the SiH-bearing alkylpolysiloxanes, in individual cases also with further terminally unsaturated compounds such as alkenes for example. As described in EP 1010748 B1, EP 887367 A3 and EP 845520 B1, such eugenol-comprising polyether siloxanes are used as diesel defoamers. No use as wetting agents has been described before.

The disadvantage, in process engineering terms, of the prior art method of preparing polyether siloxanes bearing eugenol groups and polyether groups by hydrosilylation is that two or more unsaturated products have to be added onto the SiH-bearing polyether siloxane simultaneously. Since the reactants such as eugenol and the polyether(s) to be added on (and naturally the SiH-bearing polysiloxane too) differ significantly both in terms of their molecular weight and in terms of their hydrophilic/hydrophobic character, it is difficult to prepare a polyether siloxane of uniform composition in which the different reactants are evenly distributed over all siloxane chains. Inadequate commixing thus very rapidly results in products of inhomogeneous composition and it is imperative that this be avoided for reasons of quality and cost.

In the wetting agents of the present invention, it has been possible to combine the aromatic character of hydrosilylatable eugenol with the flexibly adjustable hydrophilic/hydrophobic character of a polyether in one molecule/polymer.

A purely polyether-based wetting agent used may in principle be any eugenol polyether prepared by any prior art methods. The eugenol polyethers which are hydrosilylated onto SiH-bearing polysiloxanes in order to obtain eugenol polyether siloxanes are preferably prepared by means of transition metal-catalysed alkoxylation of eugenol, especially preferably by means of double metal cyanide catalysis. The reason for this is that the alkali-catalysed alkoxylation of eugenol has been shown to lead to isoeugenol-based polyethers (see below), and these are not hydrosilylatable.

Taking account of the fact that the isoeugenol polyethers obtained by the alkali-catalysed alkoxylation of eugenol also fulfil the demand of the invention, the use of the expression "eugenol polyethers as wetting agents" hereinafter explicitly also embraces isoeugenol structures without any explicit reference thereto in the respective text passage.

In the context of the present invention the term "alkoxylation products" or "polyethers" encompasses not only polyethers, polyetherols, polyether alcohols and polyetheresterols but also polyethercarbonate-ols, which may be used synonymously with one another. At the same time, the term "poly" does not necessarily have to mean that there are a multiplicity of ether functionalities or alcohol functionalities in the molecule or polymer. Instead, this merely suggests the presence at least of repeat units of individual monomer units or else compositions that have a relatively high molar mass and additionally a certain polydispersity.

In connection with this invention, the word fragment "poly" encompasses not just exclusively compounds having at least 3 repeat units of one or more monomers in the molecule, but in particular also those compositions of compounds which have a molecular weight distribution and at the same time have a mean molecular weight of at least 200 g/mol. This definition takes account of the fact that it is customary in the field of industry in question to refer to such compounds as polymers even if they do not appear to conform to a polymer definition as per OECD or REACH guidelines.

The term "eugenol-based polyethers" accordingly does not describe exclusively alkoxylates but also encompasses reaction products of eugenol where, in addition to alkylene oxides, further monomers (co)polymerizable by ring opening are converted, as elucidated in detail hereinafter.

The present invention provides for the use of eugenol-based polyethers and/or eugenol-based polyether siloxanes, especially of compound(s) of the formulae (I) and/or (II) described hereinafter, as wetting agents, especially as substrate wetting agents.

The present invention likewise provides compositions comprising compound(s) of the formulae (I) and/or (II) described hereinafter, and the use thereof as wetting agents, especially as substrate wetting agents.

DETAILED DESCRIPTION OF THE INVENTION

The subject-matter of the invention is described by way of example hereinafter, without any intention that the invention be restricted to these illustrative embodiments. When ranges, general formulae or compound classes are specified hereinafter, these shall include not just the corresponding ranges or groups of compounds that are explicitly mentioned but also all sub-ranges and sub-groups of compounds which can be obtained by extracting individual values (ranges) or compounds. When documents are cited in the context of the present description, the contents thereof, particularly with regard to the subject-matter that forms the context in which the document has been cited, are considered in their entirety to form part of the disclosure-content of the present invention. When chemical (empirical) formulae are used in the present invention, the reported indices can be not only absolute numbers but also average values. Indices relating to polymeric compounds are preferably average values. Unless stated otherwise, percentages are figures in percent by weight. If measured values are reported hereinbelow, these measurements, unless stated otherwise, have been conducted under standard conditions (25° C. and 1013 mbar). When average values are reported hereinbelow, the values in question are weight averages, unless stated otherwise.

Preference is given to the use of eugenol-based polyethers and/or eugenol-based polyether siloxanes, especially of the formulae (I) and/or (II), as substrate wetting agents in printing inks, printing varnishes and other paints, varnishes, inks, colour preparations and coatings applied by means of analogue or digital coating methods.

It has been found that eugenol-based polyethers and/or eugenol-based polyether siloxanes of the invention, especially of the formulae (I) and/or (II), are of particularly good suitability as substrate wetting agents in printing inks, printing varnishes and other paints, varnishes, inks, colour preparations and coatings applied by means of analogue or digital coating methods.

The compounds of the invention are especially suitable as substrate wetting agents for printing of films, paper, card, cardboard, folding boxes, pouches, bags, wallpaper, sacks, hygiene paper, labels, drinks cartons, boards, wood surfaces, metal surfaces, plastic surfaces, glass and/or ceramic.

Very particularly good results can be achieved in the case of use in products in the food industry, for example packaging and consumer articles made of paper and cardboard packaging.

These especially include corrugated cardboard (for example single-wall and multiwall qualities of the flute types used in industry and in the artistic/creative sector (for example A, B, C or E flute) with a wide variety of different liner papers (for example bogus paper, brown board, kraft liner, test liner, and singly and multiply coated and single- and multiple-volume qualities such as GD2 or Kemiart Ultra), folding boxes (for example single-sidedly coated qualities for packaging for dry foods, medicaments and other dry goods, double-sidedly coated and/or laminated qualities for moist, greasy or oily goods (e.g. frozen foods or fats)), bags (e.g. bakers' bags, paper carrier bags, single- and multi-ply bags for dry, moist and greasy goods), sacks (e.g. single- and multi-ply sacks for goods such as cement, cat litter, seeds or dry feed), hygiene papers (for example serviettes, kitchen towels, cosmetic tissues and toilet paper, also including moist tissues and impregnated pads), drinks cartons (for example the packaging from Tetra-Pak®, SIG Combibloc® or Elopak®) and other aseptic cardboard packaging.

Preference is likewise given to the use of packaging and consumer articles made from plastic. These especially include:

packaging films (e.g. PE, PP, OPP, BOPP, PET, PEN (polyethylene naphthalate, e.g Teonex®), polyesters (e.g. Hostaphan® or Melinex®), cellulose hydrate films (Cellophan®), PVC (polyvinyl chloride), up to and including "biofilms" such as PLA (polylactic acid), in single-ply form or as multi-ply composites (also referred to as laminates), protective films, separation films, decorative films (e.g. d-c-Fix® from Konrad Hornschuch AG), carrier films, transfer films, barrier films, nappy films, medical films, functionalized films and other films in common use rigid plastic materials such as plastic sheets (e.g. Plexiglas® from Evonik Industries AG, polycarbonate sheets such as Makrolon®, PVC sheets etc.).

In addition, use on metallic substrates is also possible and preferred. This especially include aluminium foils or composite materials containing aluminium (e.g. as lids for yoghurt pots, lids for ready meals and animal nutrition, packaging for medical products and similar packaging), and composite sheets (for example DiBond®) and metal sheets (for metal packaging such as biscuit tins, signs, metal panels and similar consumer articles).

In addition, use is also very possible and preferred for the construction and furniture industry, especially on sheet materials such as facing boards (available, for example, under the brand names Trespa® Meteon® or Resopal® (high-pressure laminates) or Eternit® (fibre cement sheets)), sheets and panels for interior and exterior uses (for example GFRP (glass fibre-reinforced plastic), Plexiglas®, panels made from composite material or plastic (for example the PVC panels from Deceuninck)), dry construction boards (for example gypsum plasterboard (e.g. Rigips boards from Saint-Gobain Rigips GmbH, or Drystar board or Aquapanel® from Knauf Gips KG), gypsum fibreboards (e.g. Fermacell® from Fermacell GmbH) and others such as gypsum blocks and screed elements), laminate floors (for example decorated MDF sheets (medium-density fibreboard) from Kronotex) and a wide variety of different sheet types for furniture and interior finishing (MDF, OSB (oriented strand board), plywood (sheets made from glued veneer layers), multiplex sheets (specific form of plywood board with veneer layers of different thickness and increased strength), screenprinted sheets (plywood sheets with phenolic resin coating and pattern embossed by screenprinting), glued laminated timber (sheets composed of glued and partly mortised solid wood), etc.).

In addition, use on glass and ceramic surfaces is also possible and preferred. These especially include bottles, glasses and other vessels made of glass and ceramic materials (e.g. ware or technical ceramics such as insulators or crucibles for high-temperature applications), and also a wide variety of different types of flat glass and flat ceramic material (for example flat glass (even or in a wide variety of different curvatures), tiles, technical ceramics such as heat-resistant tiles), safety glasses (for example Securit® or bullet-proof glass) and a wide variety of different tempered or coated glasses and ceramics, explicitly including technical glasses (for example spectacle glasses, lenses, panes, etc.).

In addition, use is possible and preferred in cosmetic products such as nail varnishes, and also in inks, indian inks and other colour preparations for use in or application with fountain pens, technical pens, felt pens, ballpoint pens and other writing instruments.

Additionally possible and preferred is use in paints, inks, indian inks and other paint and varnish preparations for applications by means of industrial and artistic methods, such as dipping, spraying, rolling, brush application, die application, airbrushing, curtain coating.

In addition, the eugenol-based polyethers and/or eugenol-based polyether siloxanes of the invention are suitable for use in products in which, for example, due to contact with children, the use of safe starting materials is preferred (according to DIN EN 71-3 and attributes).

The eugenol-based polyethers of the invention preferably have the constitution shown in formula (I):

Formula (I)

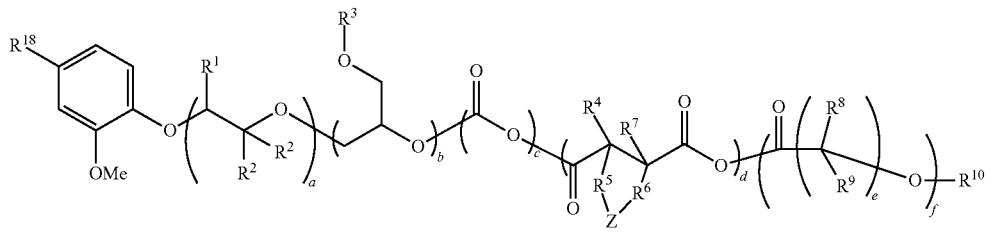

where
a=1 to 1000, preferably 2 to 500, more preferably 3 to 500, further preferably greater than 3 to 100, especially preferably 4 to 50,
b=0 to 1000, preferably 1 to 500, more preferably greater than 1 to 200, especially preferably 0 to 50,
c=0 to 1000, preferably 1 to 100, more preferably greater than 1 to 80, especially preferably 0 to 50,
d=0 to 1000, preferably 1 to 100, more preferably greater than 1 to 80, especially preferably 0 to 50,
e=1 to 10,
f=0 to 500, preferably 1 to 300, more preferably 2 to 200 and especially preferably 0 to 100,
with the proviso that the sum of a+b+c+d+f is not less than 3 and
with the proviso that the groups with the indices a, b, c, d, and f are freely permutable over the molecule chain and neither of the groups with the indices c and d may follow itself or the respective other group
and with the proviso that the different monomer units and the fragments with the indices a, b and f may be in a blockwise structure with one another, where individual blocks may also occur multiple times and may be randomly distributed among one another, or else are subject to a random distribution and further are freely permutable with one another, in the sense that they may be arranged in any desired sequence, subject to the restriction that neither of the groups with the indices c and d may follow itself or the respective other group,
and where
$R^1$=independently a hydrogen radical or an alkyl group having 1 to 8 carbon atoms, preferably hydrogen, methyl or ethyl, especially preferably hydrogen,
$R^2$=independently a hydrogen radical, an alkyl group having 1 to 20 carbon atoms, or an aryl or alkaryl group, preferably hydrogen, methyl, ethyl, octyl, decyl, dodecyl, phenyl, benzyl, more preferably hydrogen, methyl or ethyl, or
$R^1$ and one of the $R^2$ radicals may together form a ring which includes the atoms to which $R^1$ and $R^2$ are bonded, this ring preferably comprising 5 to 8 carbon atoms,
$R^3$=independently a saturated or unsaturated, aliphatic or aromatic, hydrocarbyl radical having 2 to 30 carbon atoms, especially up to 24 carbon atoms, which optionally has further substitution,
for example, $R^3$ may also contain a silyl, alkoxysilyl or carboxylic ester group, for example a dialkoxyalkylsilyl group or a trialkoxysilyl group, preferably a trimethoxysilyl group, a triethoxysilyl group, a dimethoxymethylsilyl group or a diethoxymethylsilyl group,
$R^4$, $R^7$=independently hydrogen and/or an organic radical, preferably alkyl, alkenyl, alkylidene, alkoxy, aryl and/or aralkyl groups, or else $R^4$ and/or $R^7$ may optionally be absent, where, when $R^4$ and $R^7$ are absent, there is a C=C double bond in place of the $R^4$ and $R^7$ radicals,
the bridging Z fragment may be present or absent, where, in the absence of the bridging Z fragment,
$R^5$, $R^6$=independently hydrogen and/or an organic radical, preferably alkyl, alkenyl, alkylidene, alkoxy, aryl and/or aralkyl groups, where, when one of the $R^4$ and $R^7$ radicals is absent, the respective geminal radical (i.e. $R^5$ when $R^4$ is absent and $R^6$ when $R^7$ is absent) is an alkylidene radical, preferably methylidene (=CH$_2$);
where, in the presence of the bridging Z fragment,
$R^5$, $R^6$=hydrocarbyl radicals bridged cycloaliphatically or aromatically via the Z fragment, where Z is a divalent alkylene or alkenylene radical which may have further substitution,
$R^8$, $R^9$=independently a hydrogen radical, an alkyl group having 1 to 20 carbon atoms, an aryl or alkaryl group and/or an alkoxy group, preferably a methyl group,
$R^{10}$=independently a hydrogen radical or an alkyl group having 1 to 8 carbon atoms or an ester group —C(O)—$R^{11}$ or an acetoacetate group —C(O)—CH$_2$—C(O)—$R^{12}$ or a silyl ether group —Si($R^{13}$)$_3$ or a urethane group —C(O)—N—($R^{14}$)$_2$ or a phosphoric acid group —P(O)—(O$R^{19}$)$_2$ with
$R^{11}$, $R^{12}$, $R^{13}$=independently a linear or branched, saturated or unsaturated, optionally further substituted alkyl group having 1 to 30 carbon atoms, an aryl or alkaryl group,
$R^{14}$=independently hydrogen and/or a linear or branched, saturated or unsaturated, optionally further-substituted alkyl group having 1 to 30 carbon atoms, an aryl or alkaryl group, and
$R^{18}$=independently allyl or 2-propenyl group and
$R^{19}$=independently hydrogen, alkyl group, preferably having 1 to 30, especially having 1 to 20, carbon atoms, or polyether radical,
$R^{10}$ preferably being hydrogen, a methyl group, an acetyl group, a phosphoric acid group or an acetoacetate group, especially preferably hydrogen or a phosphoric acid group.

The eugenol-based polyethers of general formula (I) preferably have at least one fragment of index a, more preferably at least two different fragments of index a.

The starter used for the transition metal-catalysed and DMC-catalysed alkoxylation reaction is preferably eugenol, which can lead to products of the formula (I) with $R^{18}$=allyl group.

The starters used for the alkali-catalysed alkoxylation reaction are preferably eugenol and isoeugenol, which can lead to products of the formula (I) with $R^{18}$=2-propenyl group.

Eugenol (CAS number 97-53-0) is an allyl-substituted phenol which is known by the chemical names 4-allyl-2-methoxyphenol, 4-prop-2-enyl-2-methoxyphenol, 4-allylpyrocatechol-2-methyl ether and 5-allylguaiacol. Eugenol is a natural raw material which is a main constituent of clove oil and pimento oil. Eugenol can be obtained by aqueous alkaline treatment (extraction) of clove oil. The sustainable origin of the eugenol raw material and the consequent eschewal of petrochemical raw materials is a substantial advantage from an ecological standpoint, particularly when it is further considered that eugenol is not in competition with any use as foodstuff.

Isoeugenol (CAS number 97-54-1) is a constitutional isomer of eugenol in which the allyl group has been rearranged to a 2-propenyl group. Isoeugenol is usually prepared by isomerization of eugenol. Therefore, compounds of the formula (I) are preferably prepared from eugenol, since it is preferable for economic and ecological reasons to dispense with the additional process step of isomerization.

Alkylene oxides that may be used generally include all alkylene oxides known to those skilled in the art and these may be used in pure form or in any desired mixtures. Examples of usable alkylene oxide compounds which lead to the fragments with the index a that are specified in formula (I) include ethylene oxide, 1,2-epoxypropane (propylene oxide), 1,2-epoxy-2-methylpropane (isobutylene oxide), epichlorohydrin, 2,3-epoxy-1-propanol, 1,2-epoxybutane (butylene oxide), 2,3-epoxybutane, 2,3-dimethyl- 2,3-epoxybutane, 1,2-epoxypentane, 1,2-epoxy-3-methylpentane, 1,2-epoxyhexane, 1,2-epoxycyclohexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, vinylcyclohexene oxide, (2,3-epoxypropyl)benzene, vinyloxirane, 3-phenoxy-1,2-epoxypropane, 2,3-epoxy methyl ether, 2,3-epoxy ethyl ether, 2,3-epoxy isopropyl ether, 3,4-epoxybutyl stearate, 4,5-epoxypentyl acetate, 2,3-epoxypropane methacrylate, 2,3-epoxypropane acrylate, glycidyl butyrate, methyl glycidate, ethyl 2,3-epoxybutanoate, 4-(trimethylsilyl)butane 1,2-epoxide, 4-(triethylsilyl)butane 1,2-epoxide, 3-(perfluoromethyl)-1,2-epoxypropane, 3-(perfluoroethyl)-1,2-epoxypropane, 3-(perfluorobutyl)-1,2-epoxypropane, 3-(perfluorohexyl)-1,2-epoxypropane, 4-(2,3-epoxypropyl)morpholine, 1-(oxiran-2-ylmethyl)pyrrolidin-2-one. Preference is given to using ethylene oxide, propylene oxide, butylene oxide and styrene oxide. Particular preference is given to using ethylene oxide and propylene oxide. In a very particularly preferred embodiment, ethylene oxide and propylene oxide are used in a molar ratio of 1:3 to 3:1, preferably of 1:2 to 2:1, especially preferably 1:1.5 to 1:1.

Glycidyl ethers which may be used and which lead to the fragments with the index b specified in formula (I) generally include all glycidyl ethers known to those skilled in the art, in pure form or in any desired mixtures.

Preference is given to methyl, ethyl, propyl, butyl, isobutyl, tert-butyl, 2-pentyl, 3-pentyl, 2-methylbutyl, 3-methylbutyl, 2-methyl-2-butyl, 3-methyl-2-butyl, 2,2-dimethylpropyl, hexyl, heptyl, octyl, 2-ethylhexyl, 2-propylheptyl, 2-butyloctanyl, 2-methylundecyl, 2-propylnonyl, 2-ethyldecyl, 2-pentylheptyl, 2-hexyldecyl, 2-butyltetradecyl, 2-dodecylhexadecyl, 2-tetradecyloctadecyl, 3,5,5-trimethylhexyl, isononanyl, isotridecyl, isomyristyl, isostearyl, 2-octyldodecyl, triphenylmethyl, $C(O)-(CH_2)_5-C-(CH_3)_3$ (residue of neodecanoic acid), $C_{12}/C_{14}$ alkyl, phenyl, cresyl, tert-butylphenyl or benzyl glycidyl ether and also to 3-glycidyloxypropyltrimethoxysilane, 3-glycidyloxypropyltriethoxysilane, 3-glycidyloxypropyltripropoxysilane, 3-glycidyloxypropyltriisopropoxysilane, bis(3-glycidyloxypropyl)dimethoxysilane, bis(3-glycidyloxypropyl)diethoxysilane, 3-glycidyloxyhexyltrimethoxysilane, 3-glycidyloxyhexyltriethoxysilane, 3-glycidyloxypropylmethyldimethoxysilane, 3-glycidyloxypropylethyldiethoxysilane. It is possible with particular preference to use 2-ethylhexyl glycidyl ether, neodecanoyl glycidyl ether, $C_{12}/C_{14}$ alkyl glycidyl ether, cresyl glycidyl ether and tert-butylphenyl glycidyl ether, and with very particular preference to use tert-butylphenyl glycidyl ether or cresyl glycidyl ether.

Glycidyl ethers which may be used also include polyfunctional glycidyl ethers such as 1,4-butanediol diglycidyl ether, 1,6-hexanediol diglycidyl ether, cyclohexanedimethanol diglycidyl ether, neopentyl glycol diglycidyl ether, polyethylene glycol diglycidyl ether, polypropylene glycol diglycidyl ether, polyglycerol-3 glycidic ether, glycerol triglycidyl ether, trimethylolpropane triglycidyl ether or pentaerythritol tetraglycidyl ether, by means of which it is also possible to introduce branched structural elements into the final alkoxylation product of the formula (I).

In order to introduce the fragments with the index c specified in formula (I) into the polyether, it is possible to conduct a copolymerization with $CO_2$.

Cyclic anhydrides which may be used and which lead to the fragments with the index d specified in formula (I) generally include all cyclic anhydrides known to those skilled in the art, in pure form or in any desired mixtures. Saturated, unsaturated or aromatic cyclic dicarboxylic anhydrides which can be used with preference include succinic anhydride, oct(en)yl-, dec(en)yl- and dodec(en)ylsuccinic anhydride, maleic anhydride, itaconic anhydride, glutaric anhydride, adipic anhydride, citraconic anhydride, trimellitic anhydride, phthalic anhydride, hexahydro-, tetrahydro-, dihydro-methylhexahydro- and methyltetrahydrophthalic anhydride, and also polyfunctional acid anhydrides such as pyromellitic dianhydride, benzophenone-3,3',4,4'-tetracarboxylic dianhydride, 1,2,3,4-butanetetracarboxylic dianhydride and free-radically polymerized homo- or copolymers of maleic anhydride with ethylene, isobutylene, acrylonitrile, vinyl acetate or styrene.

Particular preference is given to succinic anhydride, maleic anhydride, phthalic anhydride and hexahydrophthalic anhydride, especially maleic anhydride and phthalic anhydride.

Lactones which can be used and which lead to the fragments with the index f specified in formula (I) generally include all lactones known to those skilled in the art, either in pure form or in any desired mixtures.

Preference is given to valerolactones or caprolactones, each of which may be unsubstituted or substituted by alkyl groups, preferably methyl groups. Preference is given to ε-caprolactone or δ-valerolactone, especially ε-caprolactone.

The alkoxylation of OH-functional starter compounds can be effected under base, acid, or transition metal catalysis. As mentioned at the outset, the alkoxylation of eugenol is preferably conducted in the presence of double metal cyanide (DMC) catalysts if the aim is a hydrosilylating further conversion to the polyether siloxane.

The preparation and use of DMC catalysts for alkoxylation reactions has been known since the 1960s and is outlined in U.S. Pat. No. 3,427,256, U.S. Pat. No. 3,427,334, U.S. Pat. No. 3,427,335, U.S. Pat. No. 3,278,457, U.S. Pat. No. 3,278,458 and U.S. Pat. No. 3,278,459 for example. Even more effective DMC catalysts, specifically zinc-cobalt hexacyano complexes, have been developed in the meantime, for example in U.S. Pat. No. 5,470,813, U.S. Pat. No. 5,482,908 and EP 1276563 B1.

Double metal cyanide catalysts (DMC catalysts) used are preferably those described in EP 1276563 B1, particularly the DMC catalysts described therein as preferable or particularly preferable.

The terminal hydroxyl groups of the eugenol-based polyethers may remain in free form or may be modified partly or completely in order to optimize compatibility in the later application matrix.

Conceivable modifications include not only further condensation or addition reactions with isocyanates for example, but also transesterifications, esterifications and etherifications.

Esterification reactions can be conducted either with organic or with inorganic acids or the corresponding anhydrides thereof. In the case of use of poly-OH-functional acids, for example phosphoric acid, the esterification, according to the reaction regime, can in principle be effected at any free OH group, which can thus lead to linkage of two or three eugenol-based polyethers of the invention by a phosphoric acid group and hence to the formation of a corresponding di- or triester. Preferably, the reaction regime in the specific case is chosen such that mainly a monophosphoric ester of the eugenol-based polyethers of the invention is formed.

The chemical modifications of the free hydroxyl groups of the eugenol-based polyethers may be conducted with the S—H-functional polysiloxane either before or after the hydrosilylation reaction.

The polydispersity (Mw/Mn) of the eugenol-based polyethers of the formula (I), determined by GPC, is preferably <2.5, more preferably <2.0 and more preferably from >1.05 to <1.5.

As well as the eugenol polyethers of the formula (I), it is also possible to use polyether siloxanes of the general formula (II) as wetting agents.

Polyether siloxanes of the general formula (II) are preferably obtainable by a noble metal-catalysed hydrosilylation of eugenol polyethers of the formula (I) with SiH-functional siloxanes, forming an SiC bond of the polyether to the siloxane.

SiH-functional siloxanes can preferably be provided by performing the prior art process of equilibration, preferably over a sulphonated resin. The equilibration of the branched or linear, optionally hydrosilylated poly(organo)siloxanes having end and/or pendant SiH functions is described in the prior art, for example in the documents EP 1 439 200 A1, DE 10 2007 055 485 A1 and DE 10 2008 041 601. These documents are hereby incorporated by reference and are considered to form part of the disclosure of the present invention.

The preparation of the silicone polyether block copolymers used with preference can be effected by a prior art process wherein branched or linear polyorganosiloxanes having terminal and/or pendant SiH functions are reacted with an unsaturated polyether or a polyether mixture composed of at least two unsaturated polyethers. The reaction is preferably performed as a noble metal-catalysed hydrosilylation, as described in EP 1 520 870 for example. Document EP 1 520 870 is hereby incorporated by reference, as is the as yet unpublished application DE 102014217790.1. The noble metal catalyst used is preferably a catalyst comprising platinum.

In the preparation of the polyether siloxanes usable with preference as wetting agents, it may be advantageous to convert, as well as the terminally unsaturated eugenol polyethers, further linear and/or branched, unsaturated polyether compounds other than these, and likewise also further terminally unsaturated organic compounds. This can be especially advantageous in order to adjust the compatibility of the polysiloxanes containing eugenol polyethers with the particular application matrix.

Such terminally unsaturated organic compounds are preferably alkene or alkyne compounds which may bear further substituents. It is possible to use, for example, allyl glycidyl ether, glycerol monoallyl ether, allylanisole, allylphenol, eugenol, hexenol, hexadecene and methyl undecylenoate, particular preference being given to hexadecene, eugenol and glycerol monoallyl ether.

Advantageously usable polyether siloxanes may contain exclusively eugenol-based polyethers or else any desired mixtures of these eugenol-based polyethers with terminally unsaturated compounds. The molar proportion of the unsaturated eugenol-based polyethers used relative to the unsaturated compounds is preferably from 0.001 to 100 mol %, more preferably from 10 to 100 mol % and especially preferably from 20 to 80 mol %, based on the sum total of eugenol-based polyether and unsaturated compounds.

The inventive polysiloxane compounds of the formula (II)

$$M_g M'_h M''_n D_i D'_j D''_m T_k Q_l \qquad \text{Formula (II)}$$

are those where
$M=[R^{15}_3 SiO_{1/2}]$
$M'=[R^{16}R^{15}_2 SiO_{1/2}]$
$M''=[R^{17}R^{15}_2 SiO_{1/2}]$
$D=[R^{15}_2 SiO_{2/2}]$
$D'=[R^{16}R^{15} SiO_{2/2}]$
$D''=[R^{17}R^{15} SiO_{2/2}]$
$T=[R^{15} SiO_{3/2}]$
$Q=[SiO_{4/2}]$,
g=0-20, preferably 0-10, especially preferably 2,
h=0-20, preferably 0-10, especially preferably 0,
i=0-1000, preferably 0-500, especially preferably 0-200,
j=0-20, preferably 1-15, especially preferably 1-10,
k=0-20, preferably 0-10, especially preferably 0,
l=0-20, preferably 0-10, especially preferably 0,
m=0-20, preferably 1-15, especially preferably 0,
n=0-20, preferably 0-10, especially preferably 0,
with the proviso that the sum total of g+h+i+j+k+l+m is not less than 3 and that the sum of h+j≥1
and
$R^{15}$=independently identical or different hydrocarbyl radicals having 1-16 carbon atoms or H, preferably methyl, ethyl or phenyl, especially preferably methyl,
$R^{16}$=independently identical or different polyether radicals, with the proviso that at least 10% of the radicals are eugenol-based polyether radicals, the eugenol based polyether radicals preferably corresponding to the general formula (III)

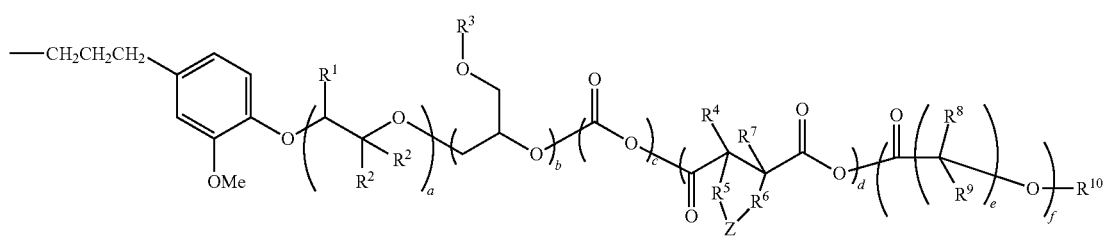

Formula (III)

Such polyethers are advantageously allyl polyethers obtainable by any prior art process.

and preferred non-eugenol-based polyethers corresponding to radicals of the general formula (IV)

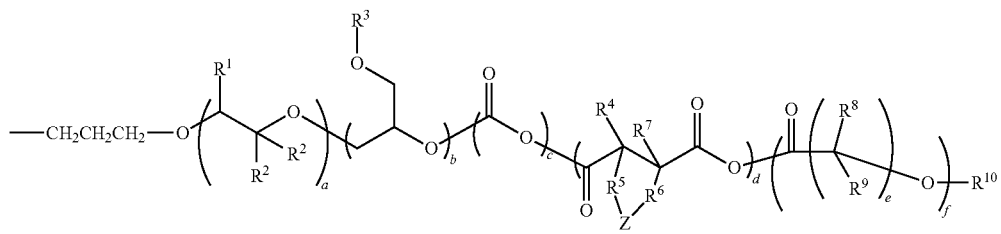

Formula (IV)

where the indices a-f and the radicals $R^1$-$R^{10}$ are as defined above, $R^{17}$=independently identical or different hydrocarbyl radicals which have 1-16 carbon atoms and may also contain heteroatoms and may have further substitution, preferably SiC-bonded radicals resulting from allyl glycidyl ether, glycerol monoallyl ether, allylanisole, eugenol, hexenol, hexadecene and methyl undecylenoate, especially preferably hexadecene, eugenol and glycerol monoallyl ether.

Compounds of the general formula (II) which, as well as eugenol-based polyethers of the formula (III), also contain further non-eugenol-based polyethers of the formula (IV), are advantageously used in those systems requiring compatibility adjustment. If the polyether siloxane contains exclusively eugenol-based polyether structures, any necessary adjustment of compatibility can also be achieved via the intrinsic structure of the eugenol-based polyether.

The polysiloxane compounds of the invention are preferably obtainable by the process described in DE 102014217790.1.

As already mentioned, the use of the eugenol-based polyethers and/or polyether siloxanes as wetting agents is envisaged in accordance with the invention, preferably as substrate wetting agents.

Substrates wetted with the products of the invention may in principle be any printable and coatable substrates known to those skilled in the art. This means both flexible and rigid substrates.

The substrates mentioned hereinafter are intended to serve for better illustration and are particularly preferred, but should not be regarded as a restriction to these specific substrates.

Suitable substrates in these applications include a wide variety of different qualities which are used in various end uses that are customary on the market.

In the end use of corrugated cardboard, these are uncoated papers, for example kraft liner, test liner and bogus paper. In the case of these paper qualities, the printability of the liner paper is affected to a significant degree by the proportion and quality of the used paper used in the production. Specifically qualities having a high proportion of unsorted used paper, as usual in the case of bogus paper, require a substrate wetting agent having defined action for clean printing, in order to reliably balance out the nonuniform surface tensions in the substrate.

In addition, in the case of corrugated cardboard, especially for higher-quality packaging, coated papers are frequently used, for example coated kraft liner (for example of the Kemiart Ultra quality from MetsäBoard) and coated test liner (for example Topliner GD2, as supplied by manufacturers such as Papyrus). The coating of such types of paper affects two parameters essential for the printing: absorptivity and surface tension. The lowering of the absorptivity and surface tension makes it difficult to achieve homogeneous wetting, which in turn necessitates the use of a substrate wetting agent having defined action.

In addition, in the case of corrugated cardboard, for specific applications, for example for the packing of doughs and other baking materials or the packaging of moisture-sensitive goods such as powders, paper qualities coated with plastics such as PE or PET are used. In addition, paper qualities provided with barrier coatings (for example the X300 grease barrier coating from Michelman) are also used in the production of secondary packaging for greasy goods (for example cooking fats). Specifically in the case of such substrates, for homogeneous wetting of the substrate, a substrate wetting agent having good efficacy and preferably having low migration with regard to applications in the food packaging sector is required.

In the end use of folding boxes and similar cardboard packaging, primarily coated paper and card qualities are used. The demands on printability and the substrate wetting agents used are analogous to those already described for the end use of corrugated cardboard.

In the end use of pouches and bags, usually kraft and natron paper having gram weights below 100 g/m² are used. These are generally only lightly coated, if at all, and compacted by calendering. The printing characteristics are similar to those of coated papers for corrugated cardboard production. As a result of the high regulatory demands on the colourfastness of packing bags such as bakers' bags and butchers' bags (fastness according to DIN EN 646 prolonged contact is required), the demands in terms of defined efficacy and minimum migration potential are particularly high in the case of paints and varnishes for these packaging materials. This necessitates the use of substrate wetting agents that are optimized in this regard.

In the end use of sack packaging, various uncoated and coated papers are used as liner papers. The sacks, which are also referred to in the industry as block bottom sacks, according to their nature and the specific weight of the goods, have a multilayer structure composed of various paper and/or plastic plies. According to the goods to be packed, there is variation both in the liner papers and in the demands on the printing inks and printing varnishes used for printing. Specifically in the case of goods such as dry feed for animals or seed, high demands are again made on lack of migration of the ingredients used. Moreover, the high demands in terms of abrasion resistance, blocking resistance and defined anti-slip properties of the surface place a great challenge on the performance of the substrate wetting agents, since these properties are closely connected to the uniformity of the paint or varnish film applied.

In the end use of newspapers, various usually uncoated and also coated papers are used as liner papers. In printing, wetting agents are used when methods such as flexographic printing, gravure printing, screenprinting or digital printing methods such as inkjet printing are being utilized. The challenge for the performance of substrate wetting agents in this end use is firstly the speed of substrate wetting (this is a quality-determining factor particularly in the case of very high-speed printing machines which reach speeds of up to 1000 m/minute), and secondly the exact control of substrate wetting. This is of crucial significance specifically in the case of uncoated or only lightly coated paper qualities, since excessive wetting can lead to uncontrolled running of the printing ink or printing varnish and hence to an inadequate printed image. In the case of coated and highly coated paper qualities, there is again the risk of printing faults as a result of inadequate substrate wetting. A further aspect is the recycling capacity of the printed papers. Here, high molecular weight substrate wetting agents, with their positive properties in terms of migration potential, make a positive contribution to an improvement in quality and extend the possible uses of the substrate qualities produced with the recycling material.

In the end uses of form printing and pinstriping inks, various paper qualities, usually lightly coated qualities, are used. However, in the case of products from the low-cost segment, uncoated papers are also used, and, for high-quality forms and writing materials, coated and calendered papers are also used as substrate. The printing is frequently effected by flexographic printing, and less commonly by gravure printing or offset printing. Screen printing is usually used only for special effects, for example the printing of raised structures such as Braille or security features. Digital printing methods such as inkjet printing are employed here either for very small runs or in combination with one of the conventional printing methods for the individualization of the prints. Similarly to the end use of newspapers, the central demand on the substrate wetting agent is the exact control of the substrate wetting and, in flexographic printing, also of the surfaces of the printing blocks used, in order to achieve a faultless exact printed image. The situation is similar with the recycling capacity of the printed papers. Here, high molecular weight substrate wetting agents, with their positive properties in terms of migration potential, make a positive contribution to an improvement in quality and extend the possible uses of the substrate qualities produced with the recycling material.

In the end uses of gift-wrapping paper, a wide range of very different paper qualities and in some cases also film qualities is used. The range goes from substantially uncoated, only lightly calendered or structured qualities as white or brown material through various coated and calendered qualities up to high-quality metallized substrates and nonwoven material. In the case of films, usually PET and OPP are printed, although other film types are also possible. The challenge for the substrate wetting agent in this application lies particularly in the homogeneous and precise wetting of the many different substrate qualities, since the producers typically produce with just one colour series if at all possible for reasons of logistics and storage. Moreover, in this very design-driven end use, the demands on appearance and hence on an exact faultless printed image are very high. Furthermore, the usually very high printing speeds (usually between 200 and 500 meters per minute) place a high demand on the substrate wetting. Printing methods employed are traditionally gravure printing and flexographic printing in particular. Screen printing is utilized comparatively rarely and, if so, usually only for special effects such as raised structures or the printing of very large effect pigments (for example mother-of-pearl pigment, glitter or flakes having particle sizes of 60 μm or more). Digital printing methods such as inkjet are usually employed here either for very small runs or for the creation of specimen collections. In the case of qualities which are used with proximity to foods, moreover, a low migration potential of the ingredients used is an important parameter. Here, high molecular weight substrate wetting agents with their positive properties in terms of migration potential are a positive factor.

In the end uses of decorative paper (papers with natural or artificial decor for consumer articles such as furniture, laminate floors, kitchen worktops, etc.), primarily absorptive papers having slight to moderate coating are used. Some of these are bulk-coloured. In addition, what are called pre-impregnates are also printed, where the decorative paper is impregnated beforehand with a melamine resin solution. The printing is primarily effected by gravure printing, usually at machine speeds of 200 to 600 meters per minute. In this respect, the same demands as also described in the other applications with high printing speeds apply here. Flexographic printing plays a lesser role in the printing of decorative papers and is used primarily in the production of simpler qualities, for example decorative material for rear cupboard walls. Nevertheless, the demands with regard to wetting of substrate and printing plate apply here too analogously to the end uses already described. Digital printing methods such as inkjet are usually employed here either for very small runs or for the creation of specimen collections. At the same time, the significance of small runs is increasing constantly as a result of the trend to individual designs and the possibility of order-based production.

Specifically the substrate qualities mentioned having high absorptivity on the one hand and a melamine resin surface on the other hand require a substrate wetting agent having defined action for clean printing, in order firstly to avoid uncontrolled penetration of ink into the printed material and secondly to reliably balance out the inhomogeneous surface tensions of the substrate. In addition, it is important that the substrate wetting agent in the downstream process steps does not lead to faults, specifically in the interlayer adhesion (substrate, decorative paper, outer layers).

In the end use of wallpaper, a wide range of very different substrate qualities is in use. The range goes from coated papers through PVC-coated papers (also called vinyl in the industry) as far as high-quality uncoated and coated non-woven fabric types. Nonwoven fabric refers in the wallpaper sector to paper qualities having a synthetic fibre content (usually PE or PP) of typically 10% to 20%. The printing methods used are likewise varied. Typically, the manufacturers combine various printing methods with one another in order to be able to achieve all the effects desired from a design point of view in one production line. Usually, flexographic printing or gravure printing is combined with rotary screen printing, roll application methods and scatter coating. In some cases, for individualizations and small runs, digital printing methods such as inkjet or toner-based printing are also used.

The challenge for the substrate wetting agent in this application lies particularly in the homogeneous and precise wetting of the many different substrate qualities by the different printing methods used, since the producers in the conventional printing sector typically produce with just one colour series if at all possible. Moreover, in this very design-driven end use, the demands on appearance and hence on an exact faultless printed image are very high. Furthermore, the very different printing speeds (usually between 40 and 300 meters per minute) place a high demand on the substrate wetting. In addition, the various effect paints used (metal effect pigments, mother-of-pearl effect pigments, glitter, flakes, luminescent pigments, conductive pigments, thermally sensitive pigments, etc.) place high demands on the substrate wetting agents, since the effects require firstly faultless wetting of the substrate and secondly optimal orientation of the effect pigments which are for the most part in platelet form.

In the end uses of hygiene papers (serviettes, kitchen towels, toilet paper, cosmetic tissues, etc., explicitly including moist tissues, impregnated cosmetic pads and similar products), primarily very absorptive papers are used, with or without light calendering. In some cases, however, nonwoven qualities having different synthetic fibre contents (generally between 5% and 100%) are used. In the individual end use, one or more (typically two to four) plies of substrate are used. In terms of printing methods, mainly flexographic printing is employed. The machine speeds generally range from 150 meters per minute up to 500 meters per minute. In some cases, however, an embossed print is used, in which the colour impression is made by the application of a coloured adhesive by means of specific embossing rollers. This method is increasingly being used in the production of toilet paper.

Specifically the substrate qualities mentioned having high absorptivity require a substrate wetting agent having defined action for clean printing, in order firstly to avoid uncontrolled penetration of ink into the printed material and secondly to reliably balance out the inhomogeneous surface tensions of the substrate. Moreover, it is important that the substrate wetting agent assures good wetting of the fibres, in order that the colour film applied adheres well and hence the prerequisites are met for the attainment of the bleeding fastnesses according to DIN EN 646 that are required for these end uses. Since the end uses are primarily with potential proximity to foods or in cosmetics, the demands on the substrate wetting agent are of course correspondingly high with regard to low migration.

In the end use of labels, various lightly to highly coated paper qualities are used. In some cases, metallized qualities are also used. In addition, a wide variety of different foil qualities are also used. However, in the case of products from the low-cost sector, uncoated, lightly calendered papers are also used. The printing is frequently effected by flexographic printing, gravure printing or offset printing. Screen printing is usually used only for special effects, for example the printing of raised structures such as Braille or security features. Digital printing methods such as inkjet printing are employed here either for very small runs or in combination with one of the conventional printing methods for the individualization of the prints. Similarly to the end use of form printing, the central demand on the substrate wetting agent is the exact control of the substrate wetting and, in flexographic printing, also of the surfaces of the printing blocks used, in order to achieve a faultless exact printed image. The situation is similar with the recycling capacity of the printed papers. Here, high molecular weight substrate wetting agents, with their positive properties in terms of migration potential, make a positive contribution to an improvement in quality and extend the possible uses of the substrate qualities produced with the recycling material.

In the end use of aseptic drinks packaging and similar cardboard packaging, primarily coated paper and card qualities are used. The demands on printability and the substrate wetting agents used are analogous to those described for the end use of corrugated cardboard.

The printing characteristics are similar to those of coated papers for corrugated cardboard production. By virtue of the high regulatory demands in this end use, the demands with regard to defined efficacy and minimum migration potential are particularly high in the case of paints and varnishes for these packaging materials. This necessitates the use of substrate wetting agents that are optimized in this regard.

In the end use of packaging films, a multitude of film qualities are used. These range from PE, PP, OPP, BOPP, PET, PEN (polyethylene naphthalate, e.g. Teonex®), polyesters (e.g. Hostaphan® or Melinex®), cellulose hydrate films (Cellophan®), PVC (polyvinyl chloride) as far as "biofilms" such as PLA (polylactic acid). This enumeration is merely illustrative. All other potentially usable film substrates are explicitly included. This applies equally in the case of the films mentioned hereinafter having various barrier or functional or effect coatings. In some cases, these films are also used having been provided with various barrier coatings (PVDC, EVOH, SiOx, AlOx, etc.), functional coatings (e.g. nanoparticles for improving scratch resistance and other mechanical properties, e.g. TEGO® Nanoresins) or metallization.

The printing is usually effected by flexographic printing or gravure printing. Screen printing is usually used only for special effects, for example the printing of raised structures such as Braille or security features. Digital printing methods such as inkjet printing are employed here either for very small runs or in combination with one of the conventional printing methods for the individualization of the prints. A further field of use for inkjet printing here is the printing of barcodes and product information such as use by/best before dates. In the industry, this sector is also referred to as coding and marking. Similarly to other end uses with nonabsorptive substrates already described, the central demand on the substrate wetting agent is the exact control of the substrate wetting and, in flexographic printing, also of the surfaces of the printing blocks used, in order to achieve a faultless exact printed image. The situation is similar with the recycling capacity of the printed films. Here, high molecular weight substrate wetting agents, with their positive properties in terms of migration potential, make a positive contribution to an improvement in quality and extend the possible uses of the substrate qualities produced with the recycling material.

The present invention further provides compositions comprising
a) at least one compound of the formula (I) or (II)
b) optionally one or more pigments and fillers
c) at least one binder
d) optionally one or more waxes
e) optionally at least one solvent
f) optionally one or more film-forming aids (coalescents)
g) optionally one or more rheology additives
h) optionally one or more defoamers
i) optionally one or more neutralizers
j) optionally other components (such as retardants, glide additives, etc.)

Compositions preferred in accordance with the invention comprise
a) at least one compound of the formula (I) or (II)
b) optionally one or more pigments and fillers
c) at least one binder
d) optionally one or more waxes
e) at least one solvent
f) optionally one or more film-forming aids (coalescents)
g) optionally one or more rheology additives
h) optionally one or more defoamers
i) optionally one or more neutralizers
j) optionally other components (such as retardants, glide additives, etc.)

Compositions particularly preferred in accordance with the invention comprise
a) at least one compound of the formula (I) or (II)
b) one or more pigments and fillers, preferably selected from the group of Pigment White 6 (titanium dioxide either in the rutile variant or in the anatase variant), Pigment Black 7 (carbon black), Pigment Blue 15:3 or Pigment Blue 15:4 (phthalocyanine pigments), Pigment Red 57:1 (laked BONA pigment (BONA=beta-oxynaphthoic acid)), Pigment Yellow 12, Pigment Yellow 13, (diarylide yellow and diarylide orange pigments), Pigment Violet 23 (dioxazine pigment) and/or Pigment Green 7 (phthalocyanine pigment),
c) at least one binder
d) optionally one or more waxes
e) optionally at least one solvent
f) optionally one or more film-forming aids (coalescents)
g) optionally one or more rheology additives
h) optionally one or more defoamers
i) optionally one or more neutralizers
j) optionally other components (such as retardants, glide additives, etc.)

Compositions especially preferred in accordance with the invention comprise
a) at least one compound of the formula (I) or (II)
b) optionally one or more pigments and fillers
c) at least one binder
d) optionally one or more waxes
e) optionally at least one solvent
f) optionally one or more film-forming aids (coalescents)
g) optionally one or more rheology additives
h) one or more defoamers
i) optionally one or more neutralizers
j) optionally other components (such as retardants, glide additives, etc.)

Compositions especially preferred in accordance with the invention comprise
a) at least one compound of the formula (I) or (II)
b) one or more pigments and fillers, preferably selected from the group of Pigment White 6 (titanium dioxide either in the rutile variant or in the anatase variant), Pigment Black 7 (carbon black), Pigment Blue 15:3 or Pigment Blue 15:4 (phthalocyanine pigments), Pigment Red 57:1 (laked BONA pigment (BONA=beta-oxynaphthoic acid)), Pigment Yellow 12, Pigment Yellow 13, (diarylide yellow and diarylide orange pigments), Pigment Violet 23 (dioxazine pigment) and/or Pigment Green 7 (phthalocyanine pigment),
c) at least one binder
d) optionally one or more waxes
e) at least one solvent, preferably at least one solvent selected from water, ethanol, isopropanol and/or ethyl acetate,
f) optionally one or more film-forming aids (coalescents)
g) optionally one or more rheology additives
h) one or more defoamers
i) optionally one or more neutralizers
j) optionally other components (such as retardants, glide additives, etc.)

especially suitable for use as printing colour, printing ink or printing varnish and other colours, varnishes, inks, colour preparations and coatings applied by means of analogue or digital coating methods for the abovementioned substrates and fields of use.

Pigments and Fillers (Component b)):
In the listing which follows, the pigment types are described utilizing the international standard colour indices.

These include especially organic pigments:
monoazo yellow and monoazo orange pigments (for example Pigment Yellow 1, Pigment Yellow 74, Pigment Yellow 111 or Pigment Orange 1), diarylide yellow and diarylide orange pigments (for example Pigment Yellow 12, Pigment Yellow 13, Pigment Yellow 14, Pigment Orange 16), bisacetoacetarylide pigments (for example Pigment Yellow 16, Pigment Yellow 155), disazopyrazolone pigments (for example Pigment Orange 13, Pigment Orange 34), β-naphthol pigments (for example Pigment Orange 5, Pigment Red 1), naphthol AS pigments (for example Pigment Red 2, Pigment Red 170, Pigment Red 184), laked β-naphthol pigments (for example Pigment Red 49:2, Pigment Red 53:1), laked BONA pigments (BONA=beta-oxynaphthoic acid) (for example Pigment Red 48:3, Pigment Red 57:1), laked naphthol AS pigments (for example Pigment Red 151, Pigment Red 247), laked naphthalenesulphonic acid pigments (for example Pigment Yellow 104, Pigment Red 60:1), benzimidazole pigments (for example Pigment Yellow 151, Pigment Yellow 181, Pigment Red 208, Pigment Violet 32), diazo condensation pigments (for example Pigment Yellow 93, Pigment Red 166, Pigment Red 242), metal complex pigments (for example Pigment Yellow 150, Pigment Red 257), isoindolinone and isoindoline pigments (for example Pigment Yellow 110, Pigment Yellow 185), phthalocyanine pigments (for example Pigment Blue 15:3, Pigment Blue 15:4, Pigment Blue 16, Pigment Green 7), quinacridone pigments (for example Pigment Violet 19, Pigment Red 122, Pigment Red 202, Pigment Red 282), perylene and perinone pigments (for example Pigment Red 123, Pigment Red 178, Pigment Black 31, Pigment Black 32, Pigment Orange 43, Pigment Red 194), thioindigo pigments (for example Pigment Red 88, Pigment Red 181), aminoanthraquinone pigments (for example Pigment Yellow 147, Pigment 89, Pigment Red 177, Pigment Blue 60, Pigment Violet 31), dioxazine pigments (for example Pigment Violet 23, Pigment Violet 37), triarylcarbonium pigments (for example Pigment Blue 56, Pigment Blue 61, Pigment Violet 3, Pigment Violet 27, Pigment Blue 62, Pigment Red 81:1, Pigment Red 81:3), quinophthalone pigments (for example Pigment Yellow 138), diketopyrrolopyrrole (DPP) pigments (for example Pigment Red 254, Pigment Red 255), aluminium laked pigments (for example Pigment Red 172, Pigment Blue 24:1, Pigment Blue 63), other organic pigments (for example Pigment Yellow 148, Pigment Yellow 182, Pigment Orange 64, Pigment Red 252, Pigment Brown 22, Pigment Black 1)

In addition, these especially include inorganic pigments:
iron oxide pigments (for example Pigment Yellow 42, Pigment Red 101, Pigment Black 11), chromium oxide pigments (for example Pigment Green 17), ultramarine pigments (for example Pigment Blue 29, Pigment Violet 15, Pigment Red 259); complex inorganic chromatic pigments (rutile pigments: for example Pigment Brown 24, Pigment Yellow 53, Pigment Yellow 164 or spinel pigments: for example Pigment Blue 28, Pigment Blue 36, Pigment Green 50, Pigment Yellow 119, Pigment Brown 29, Pigment Black 22, Pigment Black 27, Pigment Black 28); cadmium pigments (for example Pigment Yellow 35, Pigment Yellow 37, Pigment Orange 20, Pigment Red 108); bismuth vanadate pigments (for example Pigment Yellow 184); cerium sulphide pigments (for example Pigment Orange 75, Pigment Red 265), chromate pigments (for example Pigment Yellow 34, white pigments: (for example Pigment White 4 (zinc white), Pigment White 5 (lithopone composed of barium sulphate and zinc sulphide), Pigment White 6 (titanium dioxide either in the rutile variant or in the anatase variant), Pigment White 7 (zinc sulphide), Pigment White 14 (calcium carbonate), Pigment White 21 and 22 (lead white));

black pigments (for example Pigment Black 1 (aniline black), Pigment Black 7 (carbon black)).

In addition, these especially include effect pigments:

mother-of-pearl pigments (for example the Iriodin® pigments from Merck), glitter (for example the glitter products from RJA Plastics GmbH), flakes (for example the aluminium products from RJA Plastics GmbH), luminescent pigments (for example the Lumilux products from Honeywell), magnetic pigments (for example the iron oxide products from Cathay Industries), anticorrosion pigments (for example zinc phosphates, aluminium phosphates etc.), metal effect pigments (for example pigments based on aluminium, copper, gold bronzes (copper-zinc alloys), zinc and other metals, as manufactured, for example. by Carl Schlenk AG or Silberline Manufacturing Co., Inc.).

Particular preference is given to using the following pigments in many end uses:

Pigment White 6 (titanium dioxide either in the rutile variant or in the anatase variant), Pigment Black 7 (carbon black), Pigment Blue 15:3 or Pigment Blue 15:4

(phthalocyanine pigments), Pigment Red 57:1 (laked BONA pigment (BONA=beta-oxynaphthoic acid)), Pigment Yellow 12 or Pigment Yellow 13

(diarylide yellow and diarylide orange pigments), Pigment Violet 23

(dioxazine pigment), Pigment Green 7 (phthalocyanine pigment).

Preferred fillers are, for example, chalk (calcium carbonate), magnesium (magnesium carbonate), barium sulphate, etc. The term "fillers" also encompasses organic and inorganic flatting agents (for example the Acematt® and Aerosil® products from Evonik Industries AG) and all other fillers and flatting agents usable for the applications described in this document.

Binders (Component c)):

The following are usable with preference: acrylate binders (as produced, for example, under the Induprint® brand name by Indulor AG or under the Degalan® brand name by Evonik Industries AG), styrene acrylate binders (as produced, for example, under the Joncryl® brand name by BASF SE or under the Indurez® brand name by Indulor AG), polyester binders (as produced, for example, under the AddBond® or Dynapol® brand names by Evonik Industries AG), polyol resins (as produced, for example, under the VariPlus® brand name by Evonik Industries AG), maleate and fumarate binders (as produced, for example, under the Erkamar® brand name by Robert Kraemer), binders based on natural raw materials (for example binders based on sugar, starch, cellulose, casein, soya protein and derivatives thereof, and other types based on natural raw materials), polyvinyl alcohol binders (as produced, for example, under the Makrovil® brand name by Indulor AG), and all other binders usable for the applications described in this document. It is possible here to use some binders as supplied (e.g. Induprint SE 900), whereas others are used only after neutralization (e.g. Indurez SR 10) or other processing steps (e.g. casein).

Waxes and Additives Having Similar Effects (Component d)):

The waxes usable with preference includes PE waxes, PP waxes, PTFE waxes, Fischer-Tropsch waxes, amide waxes, paraffin waxes, carnauba waxes, and all other waxes and wax-like substances usable for the applications described in this document.

Solvents (Component e)):

Solvents usable with preference are preferably water or organic solvents (for example ethanol, isopropanol, butanol, methoxypropanol, ethoxypropanol, ethyl acetate, methyl ethyl ketone), alone or in combination with one another, and all other solvents usable for the applications described in this document. Particular preference is given to using water, ethanol, isopropanol and ethyl acetate.

Film-Forming Auxiliaries (Coalescents) (Component f)):

Film-forming auxiliaries usable with preference are, for example, glycols such as Dowanol DPnB, but also alcohols such as ethanol and all other film-forming auxiliaries usable for the applications described in this document.

Rheology Additives (Component g)):

Rheology additives usable with preference are organic rheology additives (for example acrylate thickeners (as produced under the Indunal® T 256 name by Indulor AG or under the Rheovis® AS 1125 SA (formerly Latekoll® D) name by BASF SE) or polyurethane thickeners (as produced, for example under the ViscoPlus® brand name by Evonik Industries AG or Tafigel® Pur by Münzing Chemie)) and inorganic rheology additives (as produced, for example, under the Aerosil® brand name by Evonik Industries AG or Bentone® by Elementis).

Defoamers (Component h)):

Defoamers usable with preference are, for example, organic-based defoaming additives (for example products such as TEGO® Foamex 833 or TEGO® Foamex 831 as produced by Evonik Industries AG) or silicone-based defoaming additives (for example products such as TEGO® Foamex N or TEGO® Foamex 3062 as produced by Evonik Industries AG) and all other defoaming substances usable for the applications described in this document.

Neutralizers (Component i)):

Neutralizers usable with preference are amines (for example ammonia, DEMA, TEA, AMP, etc.), inorganic neutralizers, for example sodium hydroxide solution, potassium hydroxide solution, etc.) and all other neutralizing agents usable for the applications described in this document.

Other Components (Component j)):

These include:

retardants which are used to adjust the drying speed (for example glycerol, propane-1,2-diol, glycols such as polyethylene glycol (e.g. PEG 200 or PEG 400))

glide additives which are used to adjust the surface smoothness (for example TEGO® Glide 482 from Evonik Industries AG)

anticorrosives which are used to minimize corrosion in paint- or varnish-guiding application devices, storage or transport vessels or metering systems (for example COBRATEC® 99 from Raschig GmbH).

markers which are used, for example, to mark cutting lines, as a security feature or for checking the application quality (particularly in the case of non-pigmented systems) (for example the products from Blankophor GmbH & Co. KG sold under the Blankophor® name)

microencapsulated active ingredients, for example the microencapsulated fragrances FOLCO SCENT® from Follmann GmbH & Co KG plasticizers which serve for lasting flexibilization of the paint or varnish layers applied (for example Elatur® CH from Evonik Industries AG)

adhesion promoters for difficult substrates (for example ADDID® 900 from Evonik Industries for the improvement of adhesion on substrates such as glass or aluminium)

conductivity additives for the modification of the surface conductivity of paint and varnish layers applied (for example ADDID® 240 from Evonik Industries AG)

additives for specific surface effects (TEGO® Hammer 501 from Evonik Industries AG for the achievement of the hammered effect in paints and varnishes)

hydrophobizing agents which serve to achieve a water-repellent effect of the paint or varnish layers applied (for example TEGO® Phobe 1650 from Evonik Industries AG)

and preferably all other components usable advantageously for the applications described in this document.

Preferred compositions of the invention contain a) 0.1% to 20% by weight, preferably 0.5% to 1.5% by weight, of at least one compound of the formula (I) or (II)

b) 0.0% to 75% by weight, preferably 2% to 50% by weight, more preferably 4% to 25% by weight, of at least one pigment, preferably at least one pigment selected from the group of Pigment White 6 (titanium dioxide either in the rutile variant or in the anatase variant), Pigment Black 7 (carbon black), Pigment Blue 15:3 or Pigment Blue 15:4 (phthalocyanine pigments), Pigment Red 57:1 (laked BONA pigment (BONA=beta-oxynaphthoic acid)), Pigment Yellow 12, Pigment Yellow 13, (diarylide yellow and diarylide orange pigments), Pigment Violet 23 (dioxazine pigment) and/or Pigment Green 7 (phthalocyanine pigment), c) 0.5% to 80% by weight, preferably 2% to 40% by weight, more preferably 7% to 30% by weight, of at least one binder d) 0.0% to 10% by weight, preferably 0.5% to 5% by weight, more preferably 1% to 2% by weight, of at least one wax e) 0.5% to 80% by weight, preferably 10% to 60% by weight, more preferably 20% to 50% by weight, of at least one solvent, preferably at least one solvent selected from water, ethanol, isopropanol and/or ethyl acetate, f) 0.5% to 70% by weight, preferably 1% to 10% by weight, more preferably 1% to 3% by weight, of at least one film-forming auxiliary g) 0.0% to 10% by weight, preferably 0.2% to 5% by weight, more preferably 0.5% to 2% by weight, of at least one rheology additive h) 0.0% to 5% by weight, preferably 0.05% to 2% by weight, more preferably 0.2% to 1% by weight, of at least one defoamer i) 0.0% to 15% by weight, preferably 0.1% to 10% by weight, more preferably 0.2% to 5% by weight, of at least one neutralizer j) 0.0% to 25% by weight, preferably 0.1% to 10% by weight, more preferably 0.2% to 5% by weight, of at least one of the components listed under j where the sum total of all the components adds up to 100% by weight and all percentages by weight are based on the total weight of the composition.

The examples adduced below illustrate the present invention by way of example, without any intention that the invention, the scope of application of which is apparent from the entirety of the description and the claims, be restricted to the embodiments specified in the examples.

Having generally described this invention, a further understanding can be obtained by reference to certain specific examples which are provided herein for purposes of illustration only, and are not intended to be limiting unless otherwise specified.

EXAMPLES

Test Methods:

Parameters or measured values are preferably determined using the methods described hereinbelow. In particular, these methods are used in the examples of the present intellectual property right.

In the context of the present invention, weight-average and number-average molecular weights for the eugenol-based polyethers prepared are determined by gel permeation chromatography (GPC) with calibration against a polypropylene glycol standard, and those of the polysiloxanes containing eugenol polyethers with calibration against a polystyrene standard. GPC was conducted using an Agilent 1100 instrument fitted with an RI detector and an SDV 1000/10000 Å column combination consisting of an 0.8×5 cm pre-column and two 0.8×30 cm main columns at a temperature of 30° C. and a flow rate of 1 ml/min (mobile phase: THF). The sample concentration was 10 g/l and the injection volume was 20 µl.

The NMR spectra were measured with a Bruker 400 MHz spectrometer using a 5 mm QMP head. Quantitative NMR spectra were measured in the presence of a suitable accelerating agent. The sample to be analysed was dissolved in a suitable deuterated solvent (methanol, chloroform) and transferred into 5 mm or, if appropriate, 10 mm NMR tubes.

Wet chemistry analysis was performed according to international standard methods: iodine number (IN; DGF C-V 11 a (53); acid number (AN; DGF C-V 2); OH number (ASTM D 4274 C).

Dynamic surface tension was measured with a SITA f10 bubble pressure tensiometer as follows: A 0.5% solution of the substance to be analysed in demineralized water was prepared. After being left to stand for 24 hours, the samples were analysed in a frequency range from 10 to 1 Hz. The tensiometer was calibrated with demineralized water prior to each measurement series.

Static surface tension was measured with a Krüss K100 tensiometer in accordance with DIN EN 14370.

Example 1: Synthesis of a Eugenol-Based Polyether (Inventive)

A 5 liter autoclave was initially charged with 351 g of eugenol, and 100 ppm (based on the overall mixture) of a zinc hexacyanocobaltate double metal cyanide catalyst was added. The reactor was inertized by injecting nitrogen to 3 bar and subsequent decompression to standard pressure. This operation was repeated twice more. While stirring, the contents of the reactor were heated to 100° C. and evacuated to about 20 mbar to remove volatile components. After 30 min, the temperature was increased to 130° C. and 100 g of propylene oxide were metered into the evacuated reactor to activate the catalyst. The internal pressure at first rose to about 0.8 bar. The pressure began to drop slowly and had dropped to −0.1 bar after about 7 minutes. A further 50 g of PO were then metered in, and then the pressure rose to 0.8 bar once more. After 12 minutes, the pressure had dropped to −0.1 bar and a further 50 g of PO were metered in. Once the pressure had dropped to 0 bar, slow, continuous metered addition of PO was commenced. After a total of 210 g of PO had been added, the pressure dropped abruptly to −0.9 bar which was taken to indicate true onset of the reaction. 38 g of propylene oxide were then metered in continuously over about 10 minutes. This was followed by further reaction for one hour. A mixture of 1110 g of EO and 1290 g of PO was then metered in continuously such that the temperature remained constant. After a further half hour of further reaction, the batch was deodorized by application of pressure (P<20 mbar) to remove residues of unconverted alkylene oxide. 500 ppm of ANOX 20 AM were subsequently stirred in over 15 minutes. A colourless to yellowish product was obtained, having an OH number of 40.2 mg KOH/g and an AN of 0.1 mg KOH/g. The molecular weight according to OH number was 1395 g/mol. According to GPC, $M_w$=1394 g/mol, $M_n$=1316 g/mol and the PDI was 1.06.

Example 2: Synthesis of a Eugenol-Based Polyether (Inventive)

A 5 liter autoclave was initially charged with 164.2 g of eugenol, and 100 ppm (based on the overall mixture) of a zinc hexacyanocobaltate double metal cyanide catalyst was added. The reactor was inertized by injecting nitrogen to 3 bar and subsequent decompression to standard pressure. This operation was repeated twice more. While stirring, the contents of the reactor were heated to 100° C. and evacuated to about 20 mbar to remove volatile components. After 30 min, the temperature was increased to 130° C. and 70 g of propylene oxide were metered into the evacuated reactor to activate the catalyst. The internal pressure at first rose to about 0.8 bar. The pressure began to drop slowly and had dropped to −0.4 bar after about 30 minutes. Slow, continuous addition of propylene oxide was then commenced. After addition of a further 56 g of PO the pressure rose to 0.7 bar and then dropped suddenly to −0.8 bar after addition of a total of 200 g of PO and this sudden drop was taken to indicate true onset of the reaction. 1673 g of propylene oxide were then metered in continuously such that the temperature remained constant. After a further half hour of further reaction, the batch was deodorized by application of pressure (P<20 mbar) to remove residues of unconverted alkylene oxide. 500 ppm of ANOX 20 AM were subsequently stirred in over 15 minutes. A colourless to yellowish product was obtained, having an OH number of 26.8 mg KOH/g and an AN of 0.1 mg KOH/g. The molecular weight according to OH number was 2093 g/mol. According to GPC, $M_w$=1957 g/mol, $M_n$=1830 g/mol and the PDI was 1.07.

Example 3: Synthesis of a Eugenol-Based Polyether (Inventive)

A 5 liter autoclave was initially charged with 544 g of eugenol, and 200 ppm (based on the overall mixture) of a zinc hexacyanocobaltate double metal cyanide catalyst was added. The reactor was inertized by injecting nitrogen to 3 bar and subsequent decompression to standard pressure. This operation was repeated twice more. While stirring, the contents of the reactor were heated to 80° C. and evacuated to about 20 mbar to remove volatile components. After 30 min, the temperature was increased to 140° C. and 80 g of propylene oxide were metered into the evacuated reactor to activate the catalyst. The internal pressure at first rose to about 0.6 bar. The pressure began to drop slowly and had dropped to −0.2 bar after about 10 minutes. A further 74 g of PO were then metered in which caused the pressure to drop slowly to −0.8 bar over 60 minutes. Metered addition of a mixture of 612 g of ethylene oxide and 691 g of propylene oxide was then commenced. 110 g of the EO/PO mixture were metered in over 30 minutes causing the pressure in the reactor to rise to 0.5 bar. A further 54 g of the mixture were then added over 15 minutes. The pressure rose to 1.5 bar before dropping suddenly to −0.5 bar which was taken to indicate true onset of the reaction. The remaining alkylene oxide mixture (1139 g) was then continuously metered in over 40 minutes. After a further half hour of further reaction, the batch was deodorized by application of pressure (P<20 mbar) to remove residues of unconverted alkylene oxide. 500 ppm of ANOX 20 AM were subsequently stirred in over 15 minutes. A colourless to yellowish product was obtained, having an OH number of 81.8 mg KOH/g and an AN of 0.1 mg KOH/g. The molecular weight according to OH number was 685 g/mol. According to GPC, $M_w$=640 g/mol, $M_n$=583 g/mol and the PDI was 1.10.

Example 4: Synthesis of a Eugenol-Based Polyether (Inventive)

A 5 liter autoclave was initially charged with 503 g of eugenol, and 100 ppm (based on the overall mixture) of a zinc hexacyanocobaltate double metal cyanide catalyst was added. The reactor was inertized by injecting nitrogen to 3 bar and subsequent decompression to standard pressure. This operation was repeated twice more. While stirring, the contents of the reactor were heated to 120° C. and evacuated to about 20 mbar to remove volatile components. After 30 min, the temperature was increased to 130° C. and 70 g of propylene oxide were metered into the evacuated reactor to activate the catalyst. The internal pressure at first rose to about 0.5 bar. The pressure began to drop slowly and had dropped to −0.9 bar after about 20 minutes. 196 g of PO were then slowly metered in over a period of 40 minutes which caused the pressure to rise to 0.5 bar After thirty minutes of post-reaction the pressure dropped to −0.4 bar and metered addition of a mixture of 1078 g of EU and 1154 g of PO was commenced. 60 g of the EO/PO mixture were metered in over 30 minutes which caused the pressure in the reactor to initially rise to a slight positive pressure and then drop suddenly to −0.9 bar which was taken to indicate true onset of the reaction. The remaining amount of alkylene oxide mixture (2172 g) was then continuously metered in over 75 minutes. After a further half hour of further reaction, the batch was deodorized by application of pressure (P<20 mbar) to remove residues of unconverted alkylene oxide. 500 ppm of ANOX 20 AM were subsequently stirred in over 15 minutes. A colourless to yellowish product was obtained, having an OH number of 51.6 mg KOH/g and an AN of 0.1 mg KOH/g. The molecular weight according to OH number was 1087 g/mol. According to GPC, $M_w$=1012 g/mol, $M_n$=945 g/mol and the PDI was 1.07.

Example 5: Acetylation of a Eugenol-Based Polyether from Example 1 (Inventive)

Under protective gas, a 2 liter three-neck flask fitted with a dropping funnel and a reflux condenser was initially charged with the eugenol-based polyether from Example 1 and a catalytic amount of concentrated hydrochloric acid and the resulting mixture was heated. Acetic anhydride was then added slowly. Once addition was complete the mixture was stirred for a further 4 h. Any residual acid was then distilled off to afford a colourless to yellowish product having an OH number of 0.1 mg KOH/g and an AN of 0.1 mg KOH/g. Within the bounds of the measurement uncertainty of the analysis, the OH number suggests quantitative acetylation of the terminal OH groups of the polyether. Within the bounds of measurement uncertainty of two independent measurements, the GPC remained unchanged compared to the polyether from Example 1. According to GPC, $M_w$=1424 g/mol, $M_n$=1316 g/mol and the PDI was 1.08.

Example 6: Methylation of a Eugenol-Based Polyether (Inventive)

Under protective gas, a 2 liter three-neck flask fitted with a dropping funnel and a reflux condenser was initially charged with the eugenol-based polyether from Example 1 together with an excess of sodium methoxide, and the resulting mixture was heated. Then methanol was distilled off under reduced pressure and methyl chloride was introduced. Once addition was complete the mixture was stirred for a further 4 h. The product was neutralized with dilute phosphoric acid. The water was distilled off under reduced pressure and the resultant salts were filtered off and a yellowish product was obtained, which corresponds to an isoeugenol polyether which had an OH number of 1.0 mg KOH/g and an AN of 0.1 mg KOH/g. Within the bounds of the measurement uncertainty of the analysis, the OH number suggests a nearly quantitative level of methylation of the terminal OH groups of the polyether of 97.5%. Within the bounds of measurement uncertainty of two independent measurements, the GPC remained unchanged compared to the polyether from Example 1. According to GPC, $M_w$=1416 g/mol, $M_n$=1324 g/mol and the PDI was 1.07.

Example 7: Phosphorylation of a Eugenol-Based Polyether (Inventive)

1395 g of eugenol-based polyether from Example 1 were initially charged in the reactor, about 50 ml of toluene were added and then the mixture was heated to 110° C. By application of reduced pressure, all volatile components, especially any water present in the product, were removed by distillation from the reaction space. After venting with nitrogen, the mixture was heated to 80° C. and 85 g of liquid polyphosphoric acid were added (0.25 mol of $P_4O_{10}$; manufacturer: Merck; content calculated as $P_4O_{10}$: about 85%). After 2 hours the reaction was complete. In the $^1$H NMR spectrum, no aliphatic hydroxyl group was detectable any longer.

Example 8a: Synthesis of an Isoeugenol-Based Polyether by Means of Alkali Catalysis from Eugenol (Inventive)

The starting weights for the synthesis corresponded to those from Example 1. A 5 liter autoclave was initially charged with eugenol together with 8 mol % of potassium methoxide. The reactor was inertized by injecting nitrogen to 3 bar and subsequent decompression to standard pressure. This operation was repeated twice more. While stirring, the contents of the reactor were heated to 100° C. and evacuated to about 20 mbar to remove the methanol from the catalysis step. Then 248 g of PO were added on at a temperature of 115° C. in such a way that the pressure in the reactor did not rise above 2 barg. Subsequently, a mixture of 1110 g of EO and 1290 g of PO was metered in continuously in such a way that the temperature remained constant and the pressure did not rise above 2 barg. After the two addition blocks, the time at which the pressure ceased to fall was awaited, which was regarded as a sign of a virtually quantitative conversion of the alkylene oxides. To complete the alkylene oxide conversion, further reaction was conducted for one hour both after the first PO block and after the random EO/PO block. Finally, the reaction mixture was deodorized by application of pressure (P<20 mbar) to remove traces of unconverted alkylene oxide. Subsequently, the polyether was neutralized with dilute phosphoric acid and stabilized with 500 ppm of ANOX 20 AM. Subsequently, the water was removed at 120° C. by distillation under reduced pressure and the precipitated salts were filtered off. A colourless to yellowish product was obtained, having an OH number of 41.3 mg KOH/g and an AN of 0.2 mg KOH/g. The molecular weight according to OH number was 1358 g/mol. According to GPC, $M_w$=1370 g/mol, $M_n$=1248 g/mol and the PDI was 1.10.

Example 8b: Synthesis of an Isoeugenol-Based Polyether by Means of Alkali Catalysis from Isoeugenol (Inventive)

The synthesis from Example 7a was conducted (1:1), except that, rather than eugenol, the same amount of isoeugenol was used. A yellowish isoeugenol polyether was obtained, having an OH number of 39.8 mg KOH/g and an AN of 0.3 mg KOH/g. The molecular weight according to OH number was 1410 g/mol. According to GPC, $M_w$=1393 g/mol, $M_n$=1675 g/mol and the PDI was 1.27.

Example 9: Preparation of a Polyether Siloxane with Eugenol-Based Polyether (Inventive)

In a 500 ml three-neck flask with thermometer, reflux condenser and precision glass stirrer, 79.0 g of an SiH-functional siloxane of the general formula $[Me_2SiHO_{1/2}]_2$ $[Me_2SiO_{2/2}]_{37}[MeSiHO_{2/2}]_3$ were admixed with 171 g of the eugenol-based polyether from Example 4. The mixture was stirred and heated to 90° C. The reaction mixture was subsequently admixed with 0.17 g of a solution of Karstedt's catalyst (CAS number: 68478-92-2) in xylene (1.5% Pt). An exothermic reaction was observed. The mixture was stirred for two hours. This gave a yellowish, clear, monophasic liquid.

Example 10: Preparation of a Polyether Siloxane with Eugenol-Based Polyether (Inventive)

In a 500 ml three-neck flask with thermometer, reflux condenser and precision glass stirrer, 44.3 g of an SiH-functional siloxane of the general formula $[Me_3SiO_{1/2}]_2$ $[Me_2SiO_{2/2}]_{13}[MeSiHO_{2/2}]_5$ were admixed with 205.7 g of the eugenol-based polyether from Example 4. The mixture was stirred and heated to 90° C. The reaction mixture was subsequently admixed with 0.17 g of a solution of Karstedt's catalyst (CAS number: 68478-92-2) in xylene (1.5% Pt). An exothermic reaction was observed. The mixture was stirred for two hours. This gave a yellowish, clear, monophasic liquid.

Example 11: Preparation of a Polyether Siloxane with Eugenol-Based Polyether and Non-Eugenol-Based Polyether (Inventive)

In a 500 ml three-neck flask with thermometer, reflux condenser and precision glass stirrer, 40.0 g of an SiH-functional siloxane of the general formula $[Me_3SiO_{1/2}]_2$ $[Me_2SiO_{2/2}]_{13}[MeSiHO_{2/2}]_5$ were admixed with 94.8 g of the eugenol-based polyether from Example 4 and 132.7 g of a polyether of the general formula $CH_2=CHCH_2O-(CH_2CH_2O)_{13}(CH_2CH(CH_3)O)_{13}Me$. The mixture was stirred and heated to 90° C. The reaction mixture was subsequently admixed with 0.18 g of a solution of Karstedt's catalyst (CAS number: 68478-92-2) in xylene (1.5% Pt). An exothermic reaction was observed. The mixture was stirred for two hours. This gave a yellowish, clear, monophasic liquid.

Example 12: Preparation of a Polyether Siloxane with Eugenol-Based Polyether (Inventive)

In a 500 ml three-neck flask with thermometer, reflux condenser and precision glass stirrer, 112.0 g of an SiH-functional siloxane of general formula $[Me_2SiHO_{1/2}]_2[Me_2SiO_{2/2}]_{28}$ were admixed with 138.0 g of the eugenol-based polyether from Example 4. The mixture was stirred and heated to 90° C. The reaction mixture was subsequently admixed with 0.17 g of a solution of Karstedt's catalyst (CAS number: 68478-92-2) in xylene (1.5% Pt). An exothermic reaction was observed. The mixture was stirred for two hours. This gave a yellowish, clear, monophasic liquid.

Example 13: Preparation of a Polyether Siloxane with Eugenol-Based Polyether (Inventive)

In a 500 ml three-neck flask with thermometer, reflux condenser and precision glass stirrer, 32.6 g of a SiH-functional siloxane of general formula $[Me_3SiO_{1/2}]_2[MeSiHO_{2/2}]_1$ were admixed with 267 g of the eugenol-based polyether from Example 1. The mixture was stirred and heated to 90° C. The reaction mixture was subsequently admixed with 0.2 g of a solution of Karstedt's catalyst (CAS number: 68478-92-2) in xylene (1.5% Pt). An exothermic reaction was observed. The mixture was stirred for five hours. This gave a yellowish, clear, monophasic liquid.

Example 14: Preparation of a Polyether Siloxane with Eugenol-Based Polyether (Inventive)

In a 500 ml three-neck flask with thermometer, reflux condenser and precision glass stirrer, 50.0 g of an SiH-functional siloxane of the general formula $[Me_3SiO_{1/2}]_2[Me_2SiO_{2/2}]_{1.75}[MeSiHO_{2/2}]_{1.25}$ were admixed with 257 g of the eugenol-based polyether from Example 1. The mixture was stirred and heated to 90° C. The reaction mixture was subsequently admixed with 0.2 g of a solution of Karstedt's catalyst (CAS number: 68478-92-2) in xylene (1.5% Pt). An exothermic reaction was observed. The mixture was stirred for five hours. This gave a yellowish, clear, monophasic liquid.

Example 15: Preparation of a Polyether Siloxane with Eugenol-Based Polyether and Non-Eugenol-Based Polyether (Inventive)

In a 500 ml three-neck flask with thermometer, reflux condenser and precision glass stirrer, 150 g of an SiH-functional siloxane of the general formula $[Me_3SiO_{1/2}]_2[Me_2SiO_{2/2}]_{113}[MeSiHO_{2/2}]_5$ were admixed with 45.9 g of the eugenol-based polyether from Example 4 and 55.1 g of a polyether of the general formula $CH_2=CHCH_2O-(CH_2CH_2O)_{13}(CH_2CH(CH_3)O)_2H$. The mixture was stirred and heated to 90° C. The reaction mixture was subsequently admixed with 0.15 g of a solution of Karstedt's catalyst (CAS number: 68478-92-2) in xylene (1.5% Pt). An exothermic reaction was observed. The mixture was stirred for two hours. This afforded a yellowish, slightly cloudy liquid.

Example 16: Preparation of a Polyether Siloxane with Eugenol-Based Polyether and Dodecene (Inventive)

164 g of an SiH-functional siloxane of general formula $Me_3SiO[SiMe_2O]_{70}[SiHMeO]_{20}SiMe_3$ were initially charged into a 1l three-neck flask. The mixture was heated to 80° C. and admixed with 6 mg of Pt in the form of Karstedt's catalyst. Then 44 g of 1-dodecene were slowly added dropwise. 424 g of the polyether from Example 4 were then metered in slowly. The reaction mixture was stirred at 80° C. for a further 2 h. This afforded a clear, homogeneous alkyl- and polyether-modified siloxane.

Example 17: Preliminary Screening

For the preliminary screening, various synthesized wetting agents and reference products were incorporated with a proportion of 0.5% into four simplified model inks (TS 162/03 to TS 162/06).

| Designation | Manufacturer | Type | TS162/03 | TS162/04 | TS162/05 | TS162/06 |
|---|---|---|---|---|---|---|
| Cyan pigment base | | Pigment base | 5 | 5 | 5 | 5 |
| Varnish base TS 128/011 | Indulor | Binder | | 30 | | |
| Varnish base TS 128/003 | BASF | Binder | | | 30 | |
| Joncryl ® 90 | BASF | Binder | 30 | | | |
| Joncryl ® FLX 500 | BASF | Binder | | | | 30 |
| Water | | | Remainder | Remainder | Remainder | Remainder |

| Formulation of varnish base TS 128/011 | | | |
|---|---|---|---|
| Designation | Manufacturer | Type | Proportion |
| Induprint ® PAC 504 H | Indulor | Binder | 52.5 |
| TEGO ® Foamex 3062 | Evonik | Defoamer | 0.3 |
| MEA | | Amine | 3.2 |
| Water | | Solvent | 44.9 |
| | | Sum total | 100 |

| Formulation of varnish base TS 128/003 | | | |
|---|---|---|---|
| Designation | Manufacturer | Type | Proportion |
| Joncryl ® 678 | BASF | Binder | 32 |
| TEGO ® Foamex 3062 | Evonik | Defoamer | 0.3 |
| MEA | | Amine | 7.6 |
| Water | | Solvent | 60.1 |
| | | Sum total | 100 |

| Formulation of cyan pigment base (Pigment Blue 15:3) | | | |
|---|---|---|---|
| Designation | Manufacturer | Type | Proportion |
| Irgalite Blue GLO (PB15:3) | BASF | Pigment | 43 |
| TEGO ® Dispers 761 W | Evonik | Dispersing additive | 1 |
| Varnish base TS 128/003 | | Binder | 18 |
| TEGO ® Foamex 3062 | Evonik | Defoamer | 0.3 |
| MEA | | Amine | 0.2 |
| Propane-1,2-diol | | Retardant | 2 |
| Water | | Solvent | 35.5 |
| | | Sum total | 100 |

The formulations were adjusted by addition of water to a viscosity of 22 to 25" (DIN 4 cup at 20° C.).

The test formulation was applied by means of a doctor bar (12 μm) to siliconized film. The wetting was assessed visually with reference to the scale detailed below.

| Designation | TS162/03 | TS162/04 | TS162/05 | TS162/06 |
|---|---|---|---|---|
| Blank | 1 | 1 | 1 | 3 |
| Polyether from Ex. 4 | 2 | 4 | 2 | 6 |
| Polyether from Ex. 5 | 2 | 2 | 3 | 8 |
| Polyether from Ex. 3 | 2 | 2 | 4 | 7 |
| Polyether from Ex. 6 | 1 | 2 | 4 | 7 |
| Polyether from Ex. 1 | 2 | 2 | 6 | 6 |
| Polyether siloxane from Ex. 13 | 1 | 2 | 4 | 4 |
| Polyether siloxane from Ex. 9 | 2 | 6 | 1 | 5 |
| Polyether siloxane from Ex. 14 | 2 | 2 | 5 | 5 |
| Polyether siloxane from Ex. 10 | 2 | 2 | 3 | 1 |
| LA-S1297 | 3 | 8 | 4 | 7 |
| Surfynol 104 H | 2 | 2 | 5 | 1 |
| BYK Dynwet 800 | 2 | 2 | 6 | 6 |
| Wet 500 | 2 | 2 | 6 | 7 |

Grade:  1 poor wetting
        5 moderate wetting
        10 very good wetting

Example 18: Performance Evaluation in the End Use of Corrugated Cardboard

For the production of the test formulation, 10% pigment base and 90% extender are mixed and adjusted by addition of water to a viscosity of 22 to 25" (DIN 4 cup at 20° C.). The test formulation is applied by means of a laboratory contact pressure applicator (Erichsen Printing Proofer or Schläfli Labratester) or narrow-web flexographic printing machine (Windmoeller and Hoelscher) to various corrugated cardboard substrates.

| Formulation of varnish base TS 128/003 | | | |
|---|---|---|---|
| Designation | Manufacturer | Type | Proportion |
| Joncryl ® 678 | BASF | Binder | 32 |
| TEGO ® Foamex 3062 | Evonik | Defoamer | 0.3 |
| MEA | | Amine | 7.6 |
| Water | | Solvent | 60.1 |
| | | Sum total | 100 |

To produce the varnish base, the liquid components are initially charged in a stainless steel vessel and heated to 70° C. by means of a hotplate while stirring (at a speed of 800 rpm with a dissolver). Then the solid resin is added to the mixture and subsequently stirred at 800 rpm with a dissolver until the solid resin has been fully neutralized. The pH is checked regularly by means of a calibrated pH meter and, if necessary, further neutralizer is metered in. Target pH 8.2 to 8.8. Pigment base formulation

| Cyan (Pigment Blue 15:3) | | | |
|---|---|---|---|
| Designation | Manufacturer | Type | Proportion |
| Irgalite Blue GLO (PB15:3) | BASF | Pigment | 43 |
| TEGO ® Dispers 761 W | Evonik | Dispersing additive | 1 |
| Varnish base TS 128/003 | | Binder | 18 |
| TEGO ® Foamex 3062 | Evonik | Defoamer | 0.3 |
| MEA | | Amine | 0.2 |
| Propane-1,2-diol | | Retardant | 2 |
| Water | | Solvent | 35.5 |
| | | Sum total | 100 |

For the production of the pigment base, the liquid components are initially charged in a wide-neck glass bottle and stirred at a speed of 800 rpm with a dissolver for 5 minutes. Then the pigment is added to the mixture and subsequently pre-dispersed with a dissolver at 3000 rpm for 20 minutes. Subsequently, the equivalent amount of glass beads (diameter 2 to 2.5 mm) is added to the mixture, and the bottle is sealed tight and shaken in a Lau disperser (shaker) at 20% cooling for 3 hours. Finally, the glass beads are sieved off and the pigment base is transferred to a fresh wide-neck glass bottle.

| Extender | | | |
|---|---|---|---|
| Designation | Manufacturer | Type | Proportion |
| Varnish base TS 128/003 | | Binder | 30 |
| Joncryl 90 | BASF | Binder | 30 |
| Ultralube D816 | Keim Additec | Wax dispersion | 2 |
| Tego ® Foamex 1488 | Evonik | Defoamer | 0.2 |
| Tego ® Foamex 830 | Evonik | Deformer | 0.4 |
| Substrate wetting agent | | Substrate wetting agent | 0.5 |
| Dowanol DPnB | Dow | Film-forming aid | 2 |
| PEG 400 | | Retardant | 1 |
| Water | | Solvent | 33.9 |
| | | Sum total | 100 |

For the production of the extender, the water is initially charged in a stainless steel vessel and further components are added while stirring with a dissolver at a speed of 800 rpm. Subsequently, the mixture is stirred with a dissolver at 800 rpm for 20 minutes. Finally, the extender is transferred into a fresh wide-neck glass bottle.

Results:

For print on top liner, white. Contact pressure application to narrow-web flexographic printing machine (manufacturer: Windmoeller and Hoelscher). The following were assessed: the lie of the ink on the printing material via visual assessment (1=very poor to 10 very good), the foam volume of the ink before and after storage (two weeks at 50° C.), the static surface tension of the ink, and the colour values.

| Substrate wetting agent | Lie | Foam [ml] | Foam after storage [ml] | Static ST [mN/m] | Colour values L a* b* |
|---|---|---|---|---|---|
| Surfynol 104 H | 8 | 54 | 52 | 31.1 | L 66.42 a* −22.28 b* −31.18 |
| Wet 500 | 8 | 53 | 51 | 30.1 | L 66.67 a* −21.75 b* −30.25 |
| Polyether from Example 8a | 8 | 51 | 52 | 31.5 | L 66.65 a* −21.77 b* −30.33 |
| Polyether siloxane from Example 14 | 8 | 50 | 52 | 32.6 | L 67.81 a* −21.45 b* −29.44 |
| Metolat 362 | 8 | 52 | 52 | 31.2 | L 68.90 a* −21.06 b* −28.56 |

It was found that both structures of the invention give comparable results to typical substrate wetting agents available on the market in terms of lie, static surface tension and colour values. It was found that, surprisingly, the two structures of the invention gave better results in terms of foaming characteristics than Surfynol 104 H, which is known for its lack of foam.

Example 19: Performance Evaluation in the End Use of Pinstriping Ink

For the production of the test formulation, 30% pigment base and 70% extender are mixed and adjusted by addition of water to a viscosity of 24 to 28" (DIN 4 cup at 20° C.). The test formulation is applied by means of a laboratory contact pressure applicator (Erichsen Printing Proofer or Schläfli Labratester) or narrow-web flexographic printing machine (Windmoeller and Hoelscher) to various substrates typical of the application.

| Formulation of varnish base TS 128/003 | | | |
|---|---|---|---|
| Designation | Manufacturer | Type | Proportion |
| Joncryl ® 678 | BASF | Binder | 32 |
| TEGO ® Foamex 3062 | Evonik | Defoamer | 0.3 |
| MEA | | Amine | 7.6 |
| Water | | Solvent | 60.1 |
| | | Sum total | 100 |

To produce the varnish base, the liquid components are initially charged in a stainless steel vessel and heated to 70° C. by means of a hotplate while stirring (at a speed of 800 rpm with a dissolver). Then the solid resin is added to the mixture and subsequently stirred at 800 rpm with a dissolver until the solid resin has been fully neutralized. The pH is checked regularly by means of a calibrated pH meter and, if necessary, further neutralizer is metered in. Target pH 8.2 to 8.8.

| Formulation of black pigment base (Pigment Black 7) | | | |
|---|---|---|---|
| Designation | Manufacturer | Type | Proportion |
| Printex 35 (PBk 7) | Orion | Pigment | 43 |
| TEGO ® Dispers 761 W | Evonik | Dispersing additive | 1 |
| Varnish base TS 128/003 | | Binder | 18 |

| Formulation of black pigment base (Pigment Black 7) | | | |
|---|---|---|---|
| Designation | Manufacturer | Type | Proportion |
| TEGO ® Foamex 3062 | Evonik | Defoamer | 0.3 |
| MEA | | Amine | 0.2 |
| Propane-1,2-diol | | Retardant | 2 |
| Water | | Solvent | 35.5 |
| | | Sum total | 100 |

For the production of the pigment base, the liquid components are initially charged in a wide-neck glass bottle and stirred at a speed of 800 rpm with a dissolver for 5 minutes. Then the pigment is added to the mixture and subsequently pre-dispersed with a dissolver at 3000 rpm for 20 minutes. Subsequently, the equivalent amount of glass beads (diameter 2 to 2.5 min) is added to the mixture, and the bottle is sealed tight and shaken in a Lau disperser (shaker) at 20% cooling for 3 hours. Finally, the glass beads are sieved off and the pigment base is transferred to a fresh wide-neck glass bottle.

| Extender | | | |
|---|---|---|---|
| Designation | Manufacturer | Type | Proportion |
| Varnish base TS 128/003 | | Binder | 30 |
| Joncryl 90 | BASF | Binder | 5 |
| Vestowax | Evonik | Solid wax | 1 |
| Tego ® Foamex 3062 | Evonik | Defoamer | 0.2 |
| Tego ® Foamex 823 | Evonik | Defoamer | 0.3 |
| Substrate wetting agent | | Substrate wetting agent | 0.5 |
| Dowanol DPnB | Dow | Film-forming aid | 30 |
| Water | | Solvent | 33 |
| | | Sum total | 100 |

For the production of the extender, the water is initially charged in a stainless steel vessel and the further components are added while stirring with a dissolver at a speed of 800 rpm. Subsequently, the mixture is stirred with a dissolver at 800 rpm for 20 minutes. Finally, the extender is transferred into a fresh wide-neck glass bottle.

For printing on commercial 80 g/m² office paper (Yes bronze copy/print from UPM). The test formulation is applied by means of a laboratory contact pressure applicator (Erichsen Printing Proofer). The following were assessed: the lie of the ink on the printing material via visual assessment (1=very poor to 10 very good), the foam volume of the ink before and after storage (two weeks at 50° C.).

| Substrate wetting agent | Lie | Foam [ml] | Foam after storage [ml] |
|---|---|---|---|
| Surfynol 104 H | 7 | 56 | 57 |
| Wet 500 | 8 | 54 | 55 |
| Polyether from Example 1 | 8 | 51 | 52 |
| Polyether siloxane from Example 14 | 9 | 51 | 53 |
| Dynwet 800 | 8 | 52 | 53 |

It was found that the two structures of the invention, in terms of lie, achieve comparable results to typical wetting agents available on the market. It was found that, surprisingly, the two structures of the invention gave better results in terms of foaming characteristics than Surfynol 104 H, which is known for its lack of foam.

Example 20: Performance Evaluation in the End Use of Gift-Wrapping Paper

For the production of the test formulation, 20% pigment base and 80% extender are mixed and adjusted by addition of water to a viscosity of 16 to 18" (DIN 4 cup at 20° C.) for gravure print application or to a viscosity of 12 to 25" (DIN 4 cup at 20° C.) for flexographic printing. The test formulation is applied by means of a laboratory contact pressure applicator (Erichsen Printing Proofer or Schläfli Labratester) or narrow-web flexographic printing machine (Windmoeller and Hoelscher) to various substrates typical of the application.

| Formulation of varnish base TS 128/005 | | | |
|---|---|---|---|
| Designation | Manufacturer | Type | Proportion |
| Erkamar ® 3300 | Robert Kraemer | Binder | 30 |
| TEGO ® Foamex 3062 | Evonik | Defoamer | 0.3 |
| MEA | | Amine | 11 |
| Water | | Solvent | 58.7 |
| | | Sum total | 100 |

To produce the varnish base, the liquid components are initially charged in a stainless steel vessel and heated to 70° C. by means of a hotplate while stirring (at a speed of 800 rpm with a dissolver). Then the solid resin is added to the mixture and subsequently stirred at 800 rpm with a dissolver until the solid resin has been fully neutralized. The pH is checked regularly by means of a calibrated pH meter and, if necessary, further neutralizer is metered in. Target pH 8.2 to 8.8.

| Formulation of cyan pigment base (Pigment Blue 15:3) | | | |
|---|---|---|---|
| Designation | Manufacturer | Type | Proportion |
| Irgalite, Blue GLO (PB15:3) | BASF | Pigment | 43 |
| TEGO ® Dispers 761 W | Evonik | Dispersing additive | 1 |
| Varnish base TS 128/005 | | Binder | 18 |
| TEGO ® Foamex 3062 | Evonik | Defoamer | 0.3 |
| MEA | | Amine | 0.2 |
| Propane-1,2-diol | | Retardant | 2 |
| Water | | Solvent | 35.5 |
| | | Sum total | 100 |

For the production of the pigment base, the liquid components are initially charged in a wide-neck glass bottle and stirred at a speed of 800 rpm with a dissolver for 5 minutes. Then the pigment is added to the mixture and subsequently pre-dispersed with a dissolver at 3000 rpm for 20 minutes. Subsequently, the equivalent amount of glass beads (diameter 2 to 2.5 mm) is added to the mixture, and the bottle is sealed tight and shaken in a Lau disperser (shaker) at 20% cooling for 3 hours. Finally, the glass beads are sieved off and the pigment base is transferred to a fresh wide-neck glass bottle.

| Extender | | | |
|---|---|---|---|
| Designation | Manufacturer | Type | Proportion |
| Varnish base TS 128/005 | | Binder | 30 |
| Joncryl 90 | BASF | Binder | 30 |
| Vestowax | Evonik | Solid wax | 1 |
| Tego ® Foamex 3062 | Evonik | Defoamer | 0.5 |
| Tego ® Foamex 823 | Evonik | Defoamer | 0.3 |
| Substrate wetting agent | | Substrate wetting agent | 0.5 |
| Glycerol | | Retardant | 1 |
| Water | | Solvent | 36.7 |
| | | | 100 |

For the production of the extender, the water is initially charged in a stainless steel vessel and the further components are added while stirring with a dissolver at a speed of 800 rpm. Subsequently, the mixture is stirred with a dissolver at 800 rpm for 20 minutes. Finally, the extender is transferred into a fresh wide-neck glass bottle.

For printing on natron paper, white, 80 g/m$^2$. Contact pressure application by means of a laboratory contact pressure applicator (Schläfli Labratester). The following were assessed: the lie of the ink on the printing material via visual assessment (1=very poor to 10 very good), the foam volume of the ink before and after storage (two weeks at 50° C.), and the static surface tension of the ink.

| Substrate wetting agent | Lie | Foam [ml] | Foam after storage [ml] | Static ST [mN/m] |
|---|---|---|---|---|
| Surfynol104 H | 8 | 54 | 52 | 31.4 |
| Wet 500 | 8 | 52 | 51 | 30.6 |
| Polyether from Example 1 | 8 | 50 | 52 | 31.7 |
| Polyether siloxane from Example 14 | 8 | 50 | 52 | 32.4 |
| Metolat 362 | 8 | 52 | 52 | 31.3 |

It was found that both structures of the invention give comparable results to typical substrate wetting agents available on the market in terms of lie, static surface tension and colour values. It was found that, surprisingly, the two structures of the invention gave better results in terms of foaming characteristics than Surfynol 104 H, which is known for its lack of foam.

Example 21: Performance Evaluation in the End Use of Film Packaging

For the production of the test formulation, 10% pigment base and 90% extender are mixed and adjusted by addition of water to a viscosity of 16 to 18" (DIN 4 cup at 20° C.) for gravure print application or to a viscosity of 12 to 25" (DIN 4 cup at 20° C.) for flexographic printing. The test formulation is applied by means of a laboratory contact pressure applicator (Erichsen Printing Proofer or Schläfli Labratester) or narrow-web flexographic printing machine (Windmoeller and Hoelscher) to various substrates typical of the application.

| Formulation of varnish base TS 128/003 | | | |
|---|---|---|---|
| Designation | Manufacturer | Type | Proportion |
| Joncryl ® 678 | BASF | Binder | 32 |
| TEGO ® Foamex 3062 | Evonik | Defoamer | 0.3 |

-continued

| Formulation of varnish base TS 128/003 | | | |
|---|---|---|---|
| Designation | Manufacturer | Type | Proportion |
| MEA | | Amine | 7.6 |
| Water | | Solvent | 60.1 |
| | | Sum total | 100 |

To produce the varnish base, the liquid components are initially charged in a stainless steel vessel and heated to 70° C. by means of a hotplate while stirring (at a speed of 800 rpm with a dissolver). Then the solid resin is added to the mixture and subsequently stirred at 800 rpm with a dissolver until the solid resin has been fully neutralized. The pH is checked regularly by means of a calibrated pH meter and, if necessary, further neutralizer is metered in. Target pH 8.2 to 8.8.

| Formulation of cyan pigment base (Pigment Blue 15:3) | | | |
|---|---|---|---|
| Designation | Manufacturer | Type | Proportion |
| Irgalite Blue GLO (PB15:3) | BASF | Pigment | 43 |
| TEGO ® Dispers 761 W | Evonik | Dispersing additive | 1 |
| Varnish base TS 128/003 | | Binder | 18 |
| TEGO ® Foamex 3062 | Evonik | Defoamer | 0.3 |
| MEA | | Amine | 0.2 |
| Propane-1,2-diol | | Retardant | 2 |
| Water | | Solvent | 35.5 |
| | | Sum total | 100 |

For the production of the pigment base, the liquid components are initially charged in a wide-neck glass bottle and stirred at a speed of 800 rpm with a dissolver for 5 minutes. Then the pigment is added to the mixture and subsequently pre-dispersed with a dissolver at 3000 rpm for 20 minutes. Subsequently, the equivalent amount of glass beads (diameter 2 to 2.5 mm) is added to the mixture, and the bottle is sealed tight and shaken in a Lau disperser (shaker) at 20% cooling for 3 hours. Finally, the glass beads are sieved off and the pigment base is transferred to a fresh wide-neck glass bottle.

| Extender | | | |
|---|---|---|---|
| Designation | Manufacturer | Type | Proportion |
| Joncryl FLX 5000 | BASF | Binder | 50 |
| TEGO ® Glide 482 | Evonik | Glide additive | 1 |
| Tego ® Foamex 842 | Evonik | Defoamer | 0.5 |
| Substrate wetting agent | | Substrate wetting agent | 0.5 |
| Propane-1,2-diol | | Retardant | 1 |
| TEGO ® ViscoPlus 3000 | Evonik | Rheology additive | 1.5 |
| Water | | Solvent | 45.5 |
| | | Sum total | 100 |

For the production of the extender, the water is initially charged in a stainless steel vessel and further components are added while stirring with a dissolver at a speed of 800 rpm. Subsequently, the mixture is stirred with a dissolver at 800 rpm for 20 minutes. Finally, the extender is transferred into a fresh wide-neck glass bottle.

For printing on PE film, white with corona pre-treatment. Contact pressure application to narrow-web flexographic printing machine (manufacturer: Windmoeller and Hoelscher). The following were assessed: the lie of the ink on the printing material via visual assessment (1=very poor to 10 very good), the foam volume of the ink before and after storage (two weeks at 50° C.), the static surface tension of the ink, and the colour values.

| Substrate wetting agent | Lie | Foam [ml] | Foam after storage [ml] | Static ST [mN/m] | Colour values L a* b* |
|---|---|---|---|---|---|
| Wet 500 | 7 | 52 | 51 | 33.4 | L 68.29 a* −32.46 b* −38.67 |
| Polyether from Example 1 | 6 | 49 | 50 | 31.1 | L 68.15 a* −32.36 b* −38.57 |
| Polyether siloxane from Example 14 | 8 | 49 | 50 | 33 | L 68.25 a* −32.35 b* −38.45 |
| Dynwet 800 | 7 | 50 | 51 | 31.9 | L 68.55 a* −32.46 b* −38.79 |
| Surfynol 420 | 6 | 54 | 51 | 31.2 | L 68.28 a* −32.76 b* −38.88 |
| Metolat 362 | 6 | 51 | 51 | 31.5 | L 69.02 a* −32.63 b* −38.84 |

It was found that both structures of the invention give comparable or better results compared to typical substrate wetting agents available on the market in terms of lie, static surface tension, foaming characteristics before and after storage, and colour values.

Example 22: Performance Evaluation in the End Use of Indian Ink and Writing Ink

For the production of the test formulation, 20% pigment base and 80% extender are mixed and adjusted by addition of water to a viscosity of 22 to 25" (DIN 4 cup at 20° C.). The test formulation was applied to various substrates typical for the application by means of a laboratory contact pressure applicator (Schläfli Labratester) or by means of a technical pen from Rotring (line width 0.35 mm).

| Formulation of varnish base TS 128/005 | | | |
|---|---|---|---|
| Designation | Manufacturer | Type | Proportion |
| Erkamar ® 3300 | Robert Kraemer | Binder | 30 |
| TEGO ® Foamex 3062 | Evonik | Defoamer | 0.3 |
| MEA | | Amine | 11 |
| Water | | Solvent | 58.7 |
| | | Sum total | 100 |

To produce the varnish base, the liquid components are initially charged in a stainless steel vessel and heated to 70° C. by means of a hotplate while stirring (at a speed of 800 rpm with a dissolver). Then the solid resin is added to the mixture and subsequently stirred at 800 rpm with a dissolver until the solid resin has been fully neutralized. The pH is checked regularly by means of a calibrated pH meter and, if necessary, further neutralizer is metered in. Target pH 8.2 to 8.8.

| Formulation of black pigment base (Pigment Black 7) | | | |
|---|---|---|---|
| Designation | Manufacturer | Type | Proportion |
| Printex 35 (PBk 7) | Orion | Pigment | 43 |
| TEGO ® Dispers 761 W | Evonik | Dispersing additive | 1 |
| Varnish base TS 128/005 | | Binder | 18 |
| TEGO ® Foamex 3062 | Evonik | Defoamer | 0.5 |
| MEA | | Amine | 0.2 |
| Monophenylglycol | | Retardant | 2.5 |
| Water | | Solvent | 34.8 |
| | | Sum total | 100 |

For the production of the pigment base, the liquid components are initially charged in a wide-neck glass bottle and stirred at a speed of 800 rpm with a dissolver for 5 minutes. Then the pigment is added to the mixture and subsequently pre-dispersed with a dissolver at 3000 rpm for 20 minutes. Subsequently, the equivalent amount of glass beads (diameter 2 to 2.5 mm) is added to the mixture, and the bottle is sealed tight and shaken in a Lau disperser (shaker) at 20% cooling for 3 hours. Finally, the glass beads are sieved off and the pigment base is transferred to a fresh wide-neck glass bottle.

| Extender | | | |
|---|---|---|---|
| Designation | Manufacturer | Type | Proportion |
| Joncryl 90 | BASF | Binder | 20 |
| Tego ® Foamex 830 | Evonik | Defoamer | 0.4 |
| Dowanol DPNB | Dow | Film-forming aid | 5 |
| Substrate wetting agent | | Substrate wetting agent | 0.5 |
| Monophenylglycol | | Retardant | 2.5 |
| Water | | Solvent | 71.6 |
| | | | 100 |

For the production of the extender, the water is initially charged in a stainless steel vessel and the further components are added while stirring with a dissolver at a speed of 800 rpm. Subsequently, the mixture is stirred with a dissolver at 800 rpm for 20 minutes. Finally, the extender is transferred into a fresh wide-neck glass bottle.

For application to commercial 80 g/m² office paper (Yes bronze copy/print from UPM). The test formulation was applied by means of a Rotring technical pen (line width 0.35 mm). The following were assessed: the writing properties of the ink on the printing material via visual assessment (1=very poor to 10 very good) and the foam volume of the ink before and after storage (two weeks at 50° C.).

| Substrate wetting agent | Lie | Foam [ml] | Foam after storage [ml] |
|---|---|---|---|
| Surfynol 104 H | 8 | 54 | 54 |
| Wet 500 | 8 | 53 | 55 |
| Polyether from Example 1 | 8 | 49 | 51 |
| Polyether siloxane from Example 14 | 8 | 49 | 52 |
| Dynwet 800 | 8 | 50 | 52 |

It was found that the two structures of the invention, in terms of lie, give comparable results to typical wetting agents available on the market. It was found that, surprisingly, the structures of the invention gave better results in terms of foaming characteristics than Surfynol 104 H, which is known for its lack of foam.

European patent application 15183632.7 filed Sep. 3, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:
1. A composition, comprising:
 a) 0.5% to 1.5% by weight of at least one compound of formula (I) or at least one compound of formula (II);
 b) 2% to 50% by weight of at least one pigment; and
 c) 2% to 40% by weight of at least one binder;
 d) 0.5% to 5% by weight of at least one wax;
 e) 10% to 60% by weight of at least one solvent;
 f) 1% to 10% by weight of at least one film-forming auxiliary;
 g) 0.2% to 5% by weight of at least one rheology additive;
 h) 0.05% to 2% by weight of at least one defoamer;
 i) 0.1% to 10% by weight of at least one neutralizing agent; and
 j) 0% to 10% by weight of a further component;
 wherein the sum of all the components adds up to 100% by weight and all percentages by weight are based on a total weight of the composition;
 wherein the at least one compound of the formula (I) is represented by:

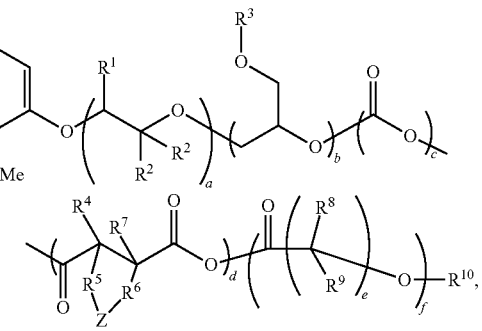

Formula (I)

wherein
a=1 to 1000;
b=0 to 1000;
c=0 to 1000;
d=0 to 1000;
e=1 to 10; and
f=0 to 500,
with the proviso that the sum of a, b, c, d and f is not less than 3;
groups with indices a, b, c, d, and f are freely permutable over a molecule chain, and neither of groups with indices c and d optionally follows itself or a respective other group; and
different monomer units of fragments with indices a, b and f are optionally in a blockwise structure with one another, wherein individual blocks also optionally occur multiple times and are optionally randomly distributed among one another, or are subject to a random distribution and further are freely permutable with one another, such that they are optionally arranged in any desired sequence, subject to a restriction that neither of the groups with the indices c and d optionally follows itself or the respective other group, wherein $R^1$=independently a hydrogen radical or an alkyl group having 1 to 8 carbon atoms, $R^2$=independently a hydrogen radical, an alkyl group having 1 to 20 carbon atoms, or an aryl or alkaryl group, or $R^1$ and one of $R^2$ optionally together form a ring comprising an atom to which $R^1$ and $R^2$ are bonded, $R^3$=independently a saturated or unsaturated, aliphatic or aromatic, hydrocarbyl radical having 2 to 30 carbon atoms, which optionally has further substitution, each of $R^4$ and $R^7$=independently a hydrogen or an organic radical, or $R^4$ and/or $R^7$ are optionally absent, wherein, when $R^4$ and $R^7$ are absent, there is a C=C double bond in place of $R^4$ and $R^7$, a bridging Z fragment is optionally present or absent, wherein, in the absence of the bridging Z fragment, each of $R^5$ and $R^6$=independently a hydrogen or an organic radical, wherein, when $R^4$ is absent, $R^5$ is an alkylidene radical or when $R^7$ is absent, $R^6$ is an alkylidene radical;

wherein, in the presence of the bridging Z fragment, each of $R^5$ and $R^6$=a hydrocarbyl radical bridged cycloaliphatically or aromatically via the bridging Z fragment, wherein Z is a divalent alkylene or alkenylene radical which optionally has further substitution, each of $R^8$ and $R^9$=independently a hydrogen radical, an alkyl group having 1 to 20 carbon atoms, an aryl or alkaryl group or an alkoxy group, $R^{10}$=independently a hydrogen radical, an alkyl group having 1 to 8 carbon atoms, an ester group —C(O)—$R^{11}$, an acetoacetate group —C(O)—$CH_2$—C(O)—$R^{12}$, a silyl ether group —Si($R^{13}$)$_3$, a urethane group —C(O)—N—($R^{14}$)$_2$ or a phosphoric acid group —P(O)—(O$R^{19}$)$_2$, each of $R^{11}$, $R^{12}$ and $R^{13}$=independently a linear or branched, saturated or unsaturated, optionally further substituted with an alkyl group having 1 to 30 carbon atoms, or an aryl or alkaryl group, $R^{14}$=independently a hydrogen, a linear or branched, saturated or unsaturated, optionally further-substituted with an alkyl group having 1 to 30 carbon atoms, or an aryl or alkaryl group, $R^{18}$=independently an allyl or 2-propenyl group, and $R^{19}$=independently a hydrogen, an alkyl group or a polyether radical, and wherein the at least one compound of the formula (II) is represented by:

$$M_g M'_h M''_n D_i D'_j D''_m T_k Q_l \qquad (II),$$

with $M=[R^{15}_3 SiO_{1/2}]$;
$M'=[R^{16} R^{15}_2 SiO_{1/2}]$;
$M''=[R^{17} R^{15}_2 SiO_{1/2}]$;
$D=[R^{15}_2 SiO_{2/2}]$;
$D'=[R^{16} R^{15} SiO_{2/2}]$;
$D''=[R^{17} R^{15} SiO_{2/2}]$;
$T=[R^{15} SiO_{3/2}]$;
$Q=[SiO_{4/2}]$;
g=0-20;
h=0-20;
i=0-1000;
j=0-20;
k=0-20;
l=0-20;
m=0-20; and
n=0-20, wherein the sum of g, h, i, j, k, l and m is not less than 3 and the sum of h and j≥1, $R^{15}$=independently a hydrocarbyl radical having 1-16 carbon atoms or a hydrogen, $R^{16}$=independently a polyether radical, wherein at least 10% of the polyether radical is an eugenol-based polyether radical, and $R^{17}$=independently a hydrocarbyl radical which has 1-16 carbon atoms and also comprises a heteroatom and optionally has further substitution.

2. The composition according to claim 1, further comprising b) one or more fillers.

3. The composition according to claim 1, wherein the eugenol-based polyether radical in $R^{16}$ corresponds to a radical of:

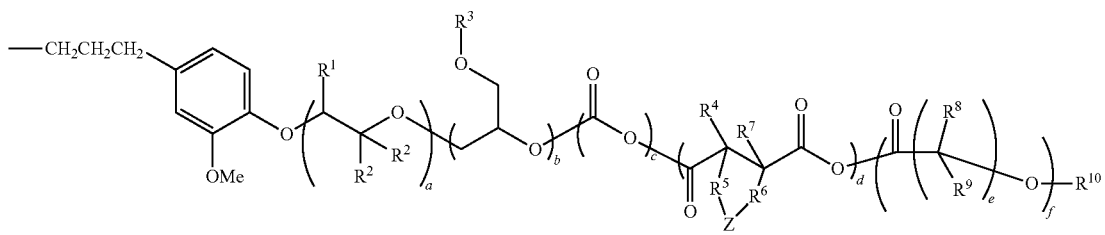

and a non-eugenol-based polyether radical in $R^{16}$ corresponds to a radical of:

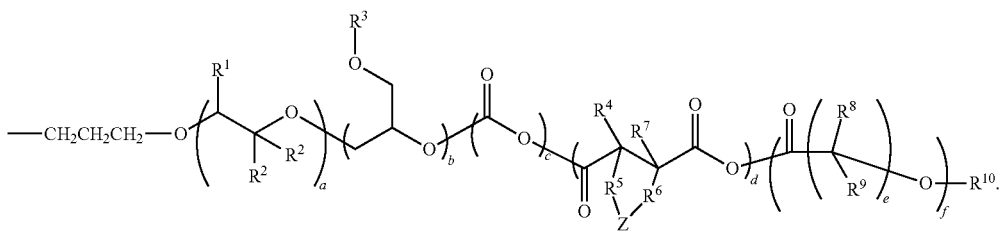

4. The composition according to claim 1, wherein the at least one solvent is at least one selected from the group consisting of water, ethanol, isopropanol and ethyl acetate.

5. The composition according to claim 2, wherein the one or more pigments are at least one selected from the group consisting of Pigment White 6, Pigment Black 7, Pigment Blue 15:3, Pigment Blue 15:4, Pigment Red 57:1, Pigment Yellow 12, Pigment Yellow 13, Pigment Violet 23 and Pigment Green 7.

6. A method for applying a coating, comprising:
applying the composition of claim 1 as a wetting agent to a substrate.

7. The method according to claim 6, wherein said substrate is a film, paper, card, cardboard, folding box, bag, wallpaper, sack, hygiene paper, drink carton, board, wood surface, metal surface, plastic surface, glass and/or ceramic.

8. The method according to claim 6, wherein an eugenol-based polyether of the formula (I) is prepared by double metal cyanide catalysis.

9. The method according to claim 6, wherein an eugenol-based polyether of the formula (I) is prepared by basic catalysis.

10. The method according to claim 6, wherein a reaction product of an eugenol-based polyether with a siloxane of the formula (II) is prepared by reacting of an eugenol-based polyether of the formula (I) with a Si—H-functional siloxane.

* * * * *